Aug. 23, 1955 W. DUBILIER 2,716,180
MEANS AND METHOD OF MANUFACTURING ELECTRICAL CONDENSERS
Filed Jan. 20, 1954 9 Sheets-Sheet 1
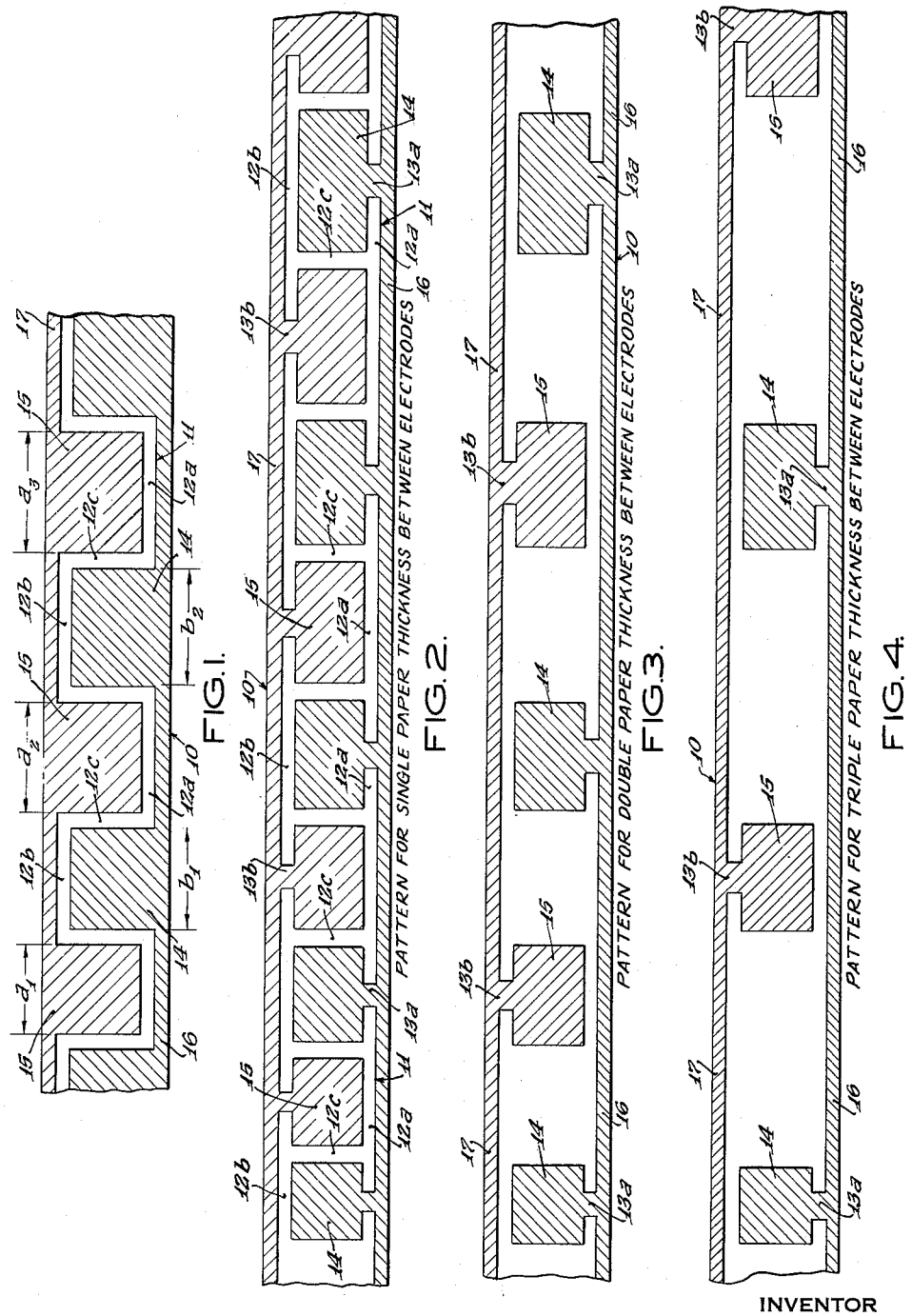
INVENTOR
WILLIAM DUBILIER
BY
ATTORNEY Aug. 23, 1955 W. DUBILIER 2,716,180
MEANS AND METHOD OF MANUFACTURING ELECTRICAL CONDENSERS
Filed Jan. 20, 1954 9 Sheets-Sheet 2
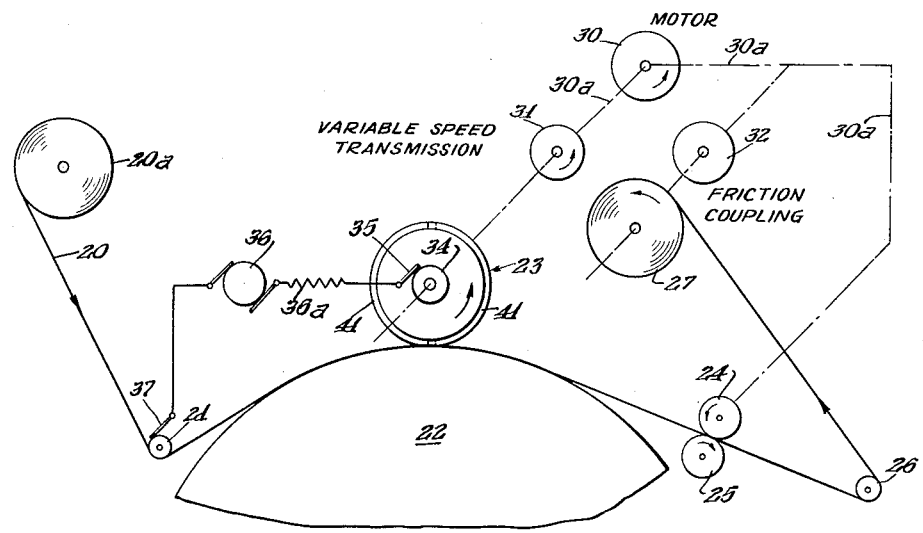
FIG.5.
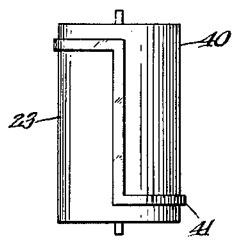
FIG.6.
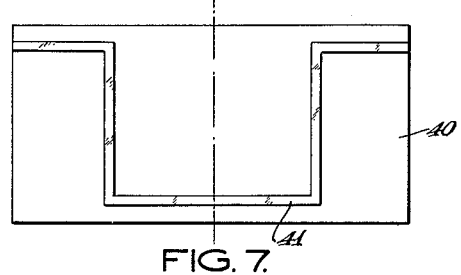
FIG. 7.
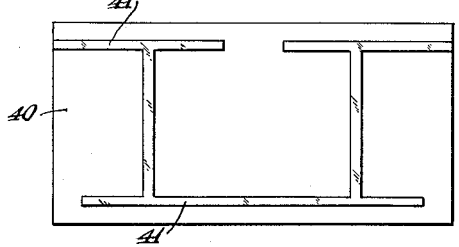
FIG. 8-A.
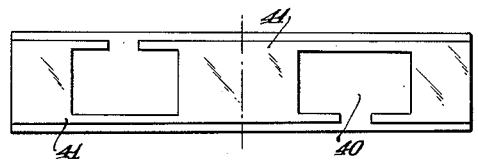
FIG. 8-B.
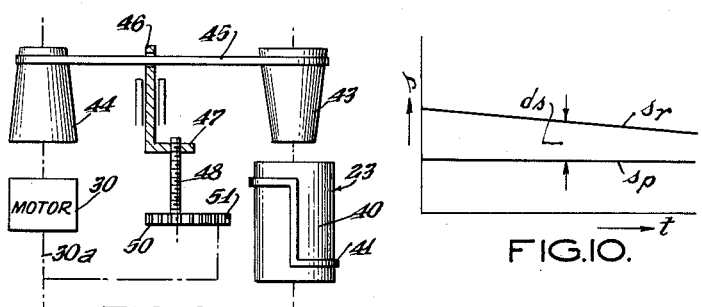
FIG.9.  FIG.10.
INVENTOR
WILLIAM DUBILIER
BY
ATTORNEY Aug. 23, 1955 W. DUBILIER 2,716,180
MEANS AND METHOD OF MANUFACTURING ELECTRICAL CONDENSERS
Filed Jan. 20, 1954 9 Sheets-Sheet 3

INVENTOR
WILLIAM DUBILIER
BY
ATTORNEY

Aug. 23, 1955 W. DUBILIER 2,716,180
MEANS AND METHOD OF MANUFACTURING ELECTRICAL CONDENSERS
Filed Jan. 20, 1954 9 Sheets-Sheet 4

INVENTOR
WILLIAM DUBILIER
BY
ATTORNEY

Aug. 23, 1955 W. DUBILIER 2,716,180
MEANS AND METHOD OF MANUFACTURING ELECTRICAL CONDENSERS
Filed Jan. 20, 1954 9 Sheets-Sheet 5

INVENTOR
WILLIAM DUBILIER
BY
ATTORNEY

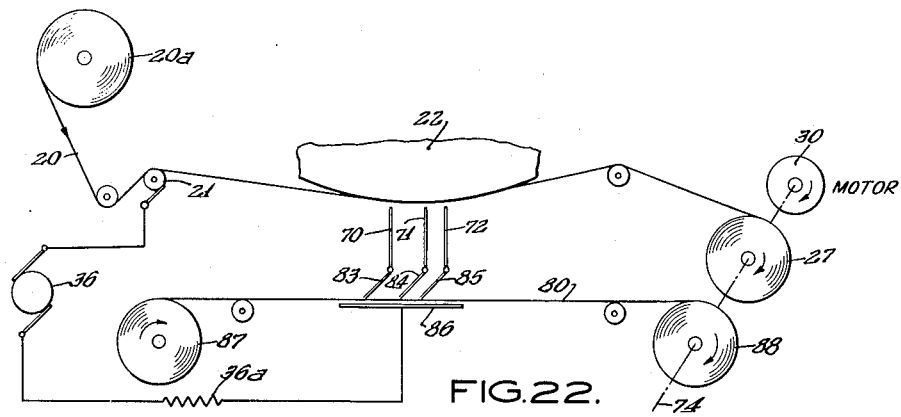
FIG.22.
FIG.23.
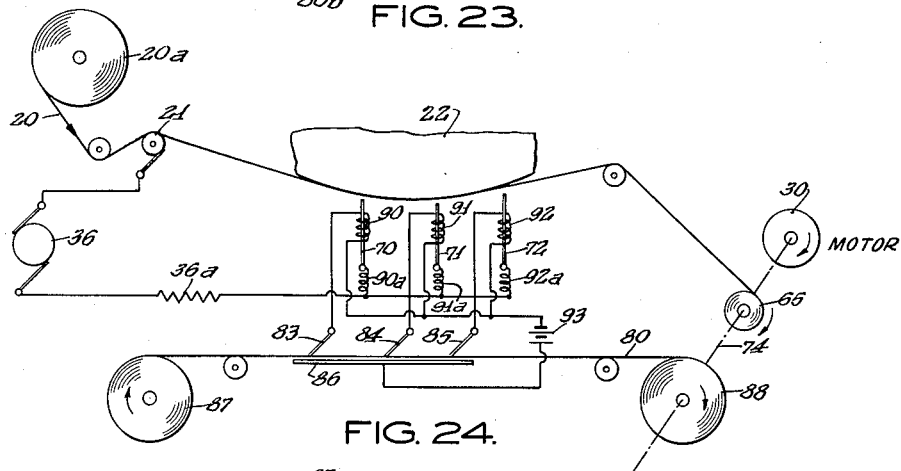
FIG.24.
FIG.25.
FIG.26.
INVENTOR
WILLIAM DUBILIER
BY
ATTORNEY Aug. 23, 1955 W. DUBILIER 2,716,180
MEANS AND METHOD OF MANUFACTURING ELECTRICAL CONDENSERS
Filed Jan. 20, 1954 9 Sheets-Sheet 7

INVENTOR
WILLIAM DUBILIER
BY
ATTORNEY

Aug. 23, 1955 W. DUBILIER 2,716,180
MEANS AND METHOD OF MANUFACTURING ELECTRICAL CONDENSERS
Filed Jan. 20, 1954 9 Sheets-Sheet 8
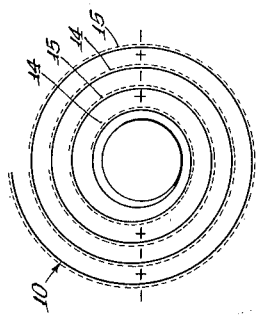
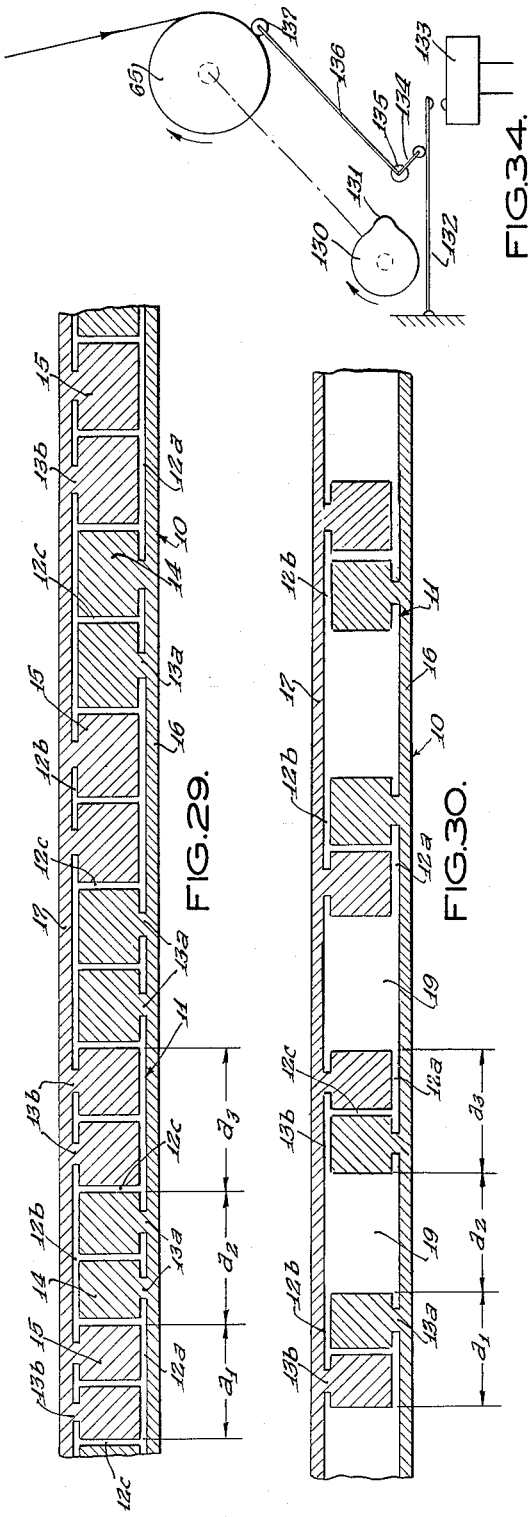
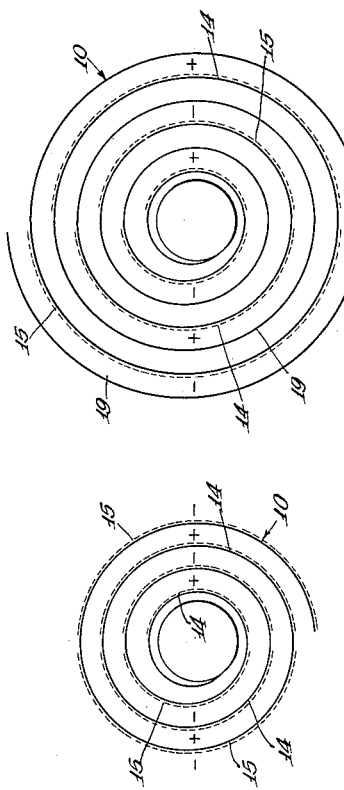
INVENTOR
WILLIAM DUBILIER
BY
ATTORNEY Aug. 23, 1955 W. DUBILIER 2,716,180
MEANS AND METHOD OF MANUFACTURING ELECTRICAL CONDENSERS
Filed Jan. 20, 1954 9 Sheets-Sheet 9
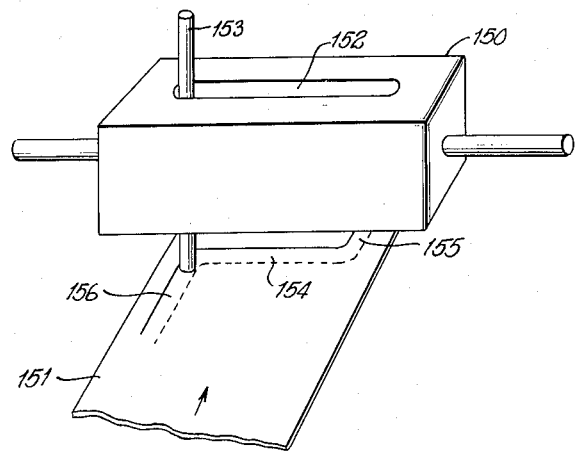
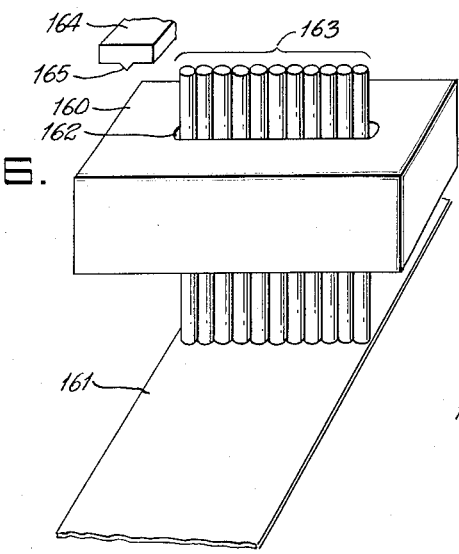
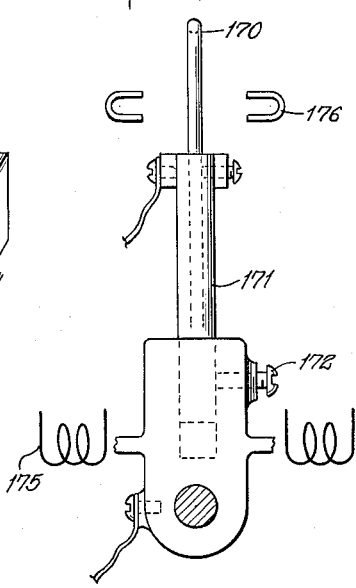
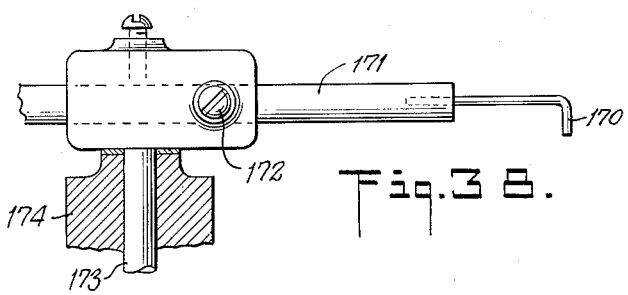
INVENTOR.
WILLIAM DUBILIER
BY W. D. Keith
ATTORNEY

United States Patent Office 2,716,180
Patented Aug. 23, 1955

2,716,180

MEANS AND METHOD OF MANUFACTURING ELECTRICAL CONDENSERS

William Dubilier, New Rochelle, N. Y.

Application January 20, 1954, Serial No. 405,092

Claims priority, application Great Britain June 2, 1950

31 Claims. (Cl. 219—19)

This invention relates to apparatus for use in the manufacture of electrical condensers and of the kind whereby transverse spacing tracks are successively burnt, by electrical discharge, at spaced intervals in a metallic layer or coating applied to a flexible dielectric strip so as to form successive metallized areas which, when the strip is rolled, for example so as to form a right-cylindrical unit, mutually cooperate to constitute the electrodes of the condenser. The invention also relates to methods of manufacturing such single web type condensers.

Such condensers, comprising only a single element or metal coated strip of paper or an equivalent flexible dielectric material, in addition to the general advantage of metallized paper condensers of being capable of automatic regeneration or self-healing when subjected to excess voltage, enable the use of a greatly simplified manufacturing technique, in that only a single element or strip has to be wound, thus eliminating the precautions and difficulties of guiding and aligning a number of strips during the fabrication of the condenser units.

This application is a continuation-in-part of my United States patent application Serial No. 205,814, filed January 12, 1951, for Means for and Method of Manufacturing Electrical Condensers.

When manufacturing an electrical condenser of the rolled type comprising two paper strips each bearing a continuous metallized coating, with the two strips wound about a common axis so that the convolutions of the two strips are interleaved and the two coatings constitute the two electrodes of opposite polarity, it has been proposed to burn away a longitudinal marginal strip from each coating by means of a "branding" roller or wheel having a narrow tread which is electrically connected to a current source through a limiting resistance, a series of small sparks or arcs taking place between the roller and the metallized coating which is thus evaporated by the heat of discharge to leave a longitudinal track clear of metal. The two strips are then rolled in interleaved relationship, the longitudinal clearance tracks at opposite ends of the rolled unit preventing short-circuiting between adjacent convolutions of opposite polarity. When, on the other hand, the electrodes are all to be formed from a single metallized coating on one and the same paper strip by burning successive transverse spacing tracks at intervals longitudinally spaced apart in the metallized coating and interconnecting alternate metallized areas to constitute each electrode, the branding wheel or roller has to be furnished with a pattern or "repeat" which will burn the transverse spacing tracks at the requisite intervals. It will be apparent that as successive convolutions are wound, the circumference of the roll increases. For example, when the roll is right-cylindrical, the circumference for each convolution increases by the increment $2\pi.T$. over that for the preceding convolution, where T is the thickness of the strip. The branding wheel must not only, therefore, have a circumference sufficient for the subdivision of the whole length of the metallized surface on the strip, but the pattern or repeat engraved or otherwise formed on the tread of the wheel must be such as progressively to increase the spacings between the successive transverse tracks by the said increment.

The progressive increase in the spacings between the successive transverse tracks in accordance with the incremental increase in circumference of the roll, which may conveniently be referred to as the "progressively altered pitch" of the pattern, assures that the width or "pitch" of each successive electrode area corresponds to the respective circumference or convolution of the wound unit and causes the cooperating areas of opposite polarity to overlap or register throughout the wound unit.

Since the successive repeats on the wheel are necessarily fixed relatively to each other, the branding wheel can only be used for the manufacture of one particular condenser and, moreover, while the wheel may be suitable for use in producing condensers of small dimensions and capacitances, the size of wheel required for condensers of larger dimensions and capacitances, for example of 0.1 microfarad or more, becomes impracticably large.

The present invention has for its object not only to overcome the above difficulties, particularly, though not exclusively, in the manufacture of the larger sizes and capacitances, but also to meet, by one and the same apparatus, variations due to the use of dielectrics of different thicknesses and variations required to permit the production of patterns appropriate to widely differing capacitance values.

A further object of this invention is to provide methods and apparatus for the manufacture of single element or single web metallized condensers having longitudinal and transverse spacing tracks removed or burnt thereon to provide successive metallized areas of progressively altered pitch which, when the strip or web is wound in roll form, mutually cooperate or register to constitute the electrodes of the condenser.

Other objects and advantages of the invention will be pointed out in the following disclosure and claims and illustrated in the accompanying drawings, which illustrate by way of example the presently preferred apparatus incorporating the principles of the invention.

The invention will be better understood from the following general and detailed description taken in conjunction with the accompanying drawings, forming part of this specification, and wherein:

Fig. 1 shows a metal coated paper strip provided with a burnt zig-zag shaped insulating spacing track or pattern, to provide alternate electrode areas of opposite polarity which overlap or register in the wound unit or condenser;

Fig. 2 shows a similar metallized strip provided with an improved electrode pattern according to the invention;

Figs. 3 and 4 show further metallized strips having modified electrode patterns suitable for producing condensers having two or three layers of paper or dielectric separating the electrodes of opposite polarity;

Fig. 5 illustrates diagrammatically a branding or patterning system according to the invention, embodying a single variable speed branding wheel or roller for patterning a metallized paper strip moved at substantially constant speed;

Fig. 6 is a top view of the branding roller shown in Fig. 5;

Fig. 7 shows the branding roller in developed form;

Figs. 8A and 8B show modified branding rollers in developed form for producing electrode patterns according to Figs. 2 and 3, respectively;

Fig. 9 illustrates schematically a mechanical variable speed control device for use in connection with the invention;

Fig. 10 is a graph explanatory of the operation of Fig. 5;

Fig. 22 shows a modified branding system using a perforated control tape according to the invention;

Fig. 23 shows a control tape suitable for use in connection with Fig. 22;

Fig. 24 shows still another modification of an electrode patterning system using branding elements or electrodes successively moved to and from operative position by electrical control means;

Figs. 25 and 26 are side and top views, respectively, of still another branding device using a pair of branding rollers with Z-shaped patterns according to the invention;

Figs. 29 and 30 show further modifications of electrode patterns, wherein the electrode areas of opposite polarity registering in the rolled unit have a length equal to a fraction of a turn or convolution, Fig. 29 showing a pattern for a single layer, and Fig. 30 showing a pattern for making a double layer condenser;

Figs. 31 and 32 are diagrammatic cross-sections of wound condenser units made with patterned strips of the type shown in Figs. 29 and 30, respectively;

Figure 11:
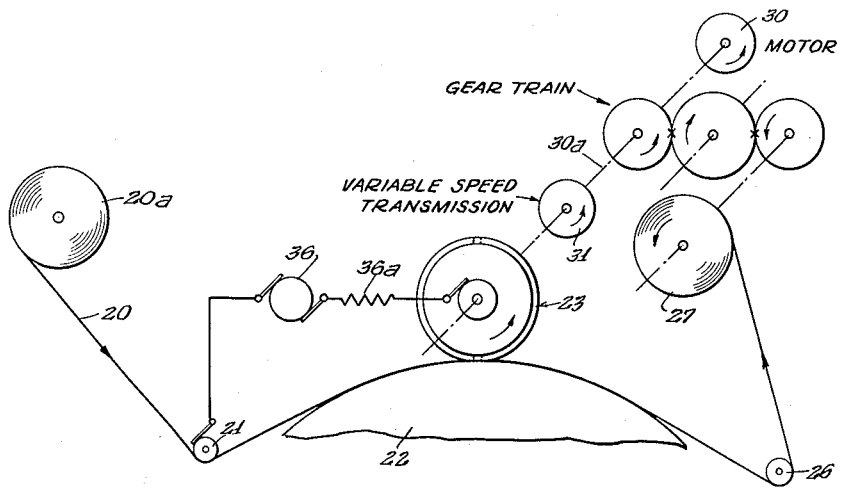
Fig. 11 is a schematic diagram, similar to Fig. 1, with both the paper strip and branding roller being operated at varying speeds.

Fig. 33 diagrammatically shows a section through a wound condenser wherein electrodes equal to a full turn or convolution lap or register;

Fig. 34 illustrates schematically a feature of improvement according to the invention, to produce transverse tracks of constant width in connection with patterning methods involving a varying speed of the strip being branded or patterned;

Fig. 35 diagrammatically shows a single rod type branding electrode unit adapted to produce the desired zig-zag track upon the metallized strip;

Fig. 36 diagrammatically shows a multiple rod type of branding electrode unit with an associated reciprocating contact device;

Fig. 37 diagrammatically illustrates a plan view of an alternative single rod type branding electrode and the mounting therefor; and Fig. 38 is a diagrammatic side elevational view of the electrode illustrated in Fig. 37.

Like reference characters identify like parts throughout the different views of the drawings.

In apparatus according to the invention, means are provided whereby the intervals between the successive transverse spacing tracks can be determined at will.

For the purposes of convenience the various embodiments of the invention will first be generally described and then later described in detail in conjunction with the specifically illustrated embodiment thereof in the drawings.

The apparatus may comprise a plurality of branding elements which are successively rendered operative on the metallized coating of the strip at predetermined intervals, and means whereby the said intervals can be adjusted to suit requirements, for example in accordance with the rate of increase of the circumference as the strip is rolled up. Preferably, the apparatus includes branding elements comprising lateral rods, ribs or rollers transverse to the length of the metallized strip whereby the successive transverse spacing tracks are burnt in the metallized coating, and longitudinal rods, ribs or rollers parallel to the said length whereby clearance tracks are burnt parallel to the longitudinal edges of the strip, the said longitudinal tracks constituting continuations of the transverse tracks. For example, the branding elements may be so rendered operative successively that two longitudinal tracks extend in opposite directions, respectively, from the two ends of each transverse track to the adjacent ends of the two adjacent transverse tracks. In one such arrangement, each branding element comprises a segment, shoe or roller having an approximately Z-shaped tread or rib thereon, the two end limbs of the Z burning the two longitudinal tracks, whereas the interconnecting limb burns the transverse track. According to another arrangement, the branding elements comprise a plurality of transverse rods or rollers which are successively rendered operative to burn the transverse tracks, and a plurality of rods or rollers which are successively rendered operative to burn the longitudinal tracks. Each longitudinal track may be spaced from the adjacent longitudinal edge of the metallized coating whereby a continuous zig-zag track is burnt wholly within the metallized area of the strip.

Throughout the specification where the term "branding element" is generally used without additional specificity, it is to be interpreted as meaning branding or demetallizing electrodes or elements of any shape and of any electrical connection into the demetallizing electrical circuit.

The intervals between successive brandings may be adjusted by varying the timing between successive contacts of the branding elements with the metallized strip, and/or by appropriately timing the supply of electric current to the branding elements. For example, relative movement, at constant speed, may be effected between the branding elements and the metallized strip in the direction of the length thereof, means being provided for varying the intervals between successive energizations of the branding elements and/or successive contacts thereof with the strip. If desired, however, means may be provided for varying the rate of relative movement between the branding elements and the strip in the direction of the length thereof, and means whereby the branding elements are successively energized, and/or brought into contact with the strip, at constant intervals.

In this latter method of operation, the production of the necessary relative movement between the branding elements and the strip along the length thereof, while operating the branding element, such as a wheel, at constant speed, is readily effected by gradually increasing the lineal speed of the strip past the branding elements. In a simple type of apparatus this increase in lineal strip speed is readily accomplished by winding the strip at a constant speed of rotation, the circumferential build-up effecting the desired increase in lineal speed of the strip past the branding elements. In the operation of the various types of apparatus disclosed herein and in following the methods of this invention, either one of these general approaches may be used to obtain the desired progressively altered pitch of the electrode areas along the length of the strip. The first of these involves operating or actuating the branding elements at a constant rate so that the demetallizing action is a periodically repeated operation and progressively varying the rate of strip advance past the branding elements. The second of these involves the alternative method of maintaining the rate of strip advance past the branding elements as a constant and progressively varying the rate of operating or actuating the branding elements. It will also be recognized that it is possible to progressively vary both the rate of actuation or operation of the branding elements and the rate of paper advance with suitable controls and thus produce the desired progressive alteration of the pitch of the electrode areas.

The invention may be carried into practice in various ways, but in one construction according to the invention, the apparatus comprises two or more branding elements each in the form of an arcuate shoe or segment having a raised pattern or repeat engraved or otherwise formed thereon, each repeat comprising a raised rib of rectangular Z formation. The main or intermediate limb of the Z extends at right angles across the arcuate surface of the segment and the two minor or end limbs extend, in opposite directions respectively from the two ends of the intermediate limb, along the arcuate tread of the segment. The overall spacing between the end limbs is somewhat less than the width of the metal coating on a paper strip from which the condenser is to be formed.

The branding elements may constitute segments of one and the same branding wheel or may be carried by, or may constitute parts of, two or more branding wheels or rollers respectively. The branding elements are brought into contact with the metal coating successively so that the first segment burns away a spacing track in the coating transverse to the length of the strip and a first and second longitudinal clearance track parallel to, but laterally spaced from, the opposite longitudinal edges of the coating. The first and second longitudinal clearance tracks thus form continuations of the transverse spacing track but extend in opposite directions respectively from the two ends thereof so that the track burnt in the metallized layer is approximately in the form of a rectangular Z. The second branding element repeats this Z-shaped track, with the first longitudinal clearance track formed thereby in continuation of the second longitudinal clearance track formed by the first branding element. A third branding element (or the first branding element reapplied) is now rendered operative on the strip, the first longitudinal track formed by the third element being in continuation of the second longitudinal track formed by the second element, and so on. This sequence produces a continuous rectangular zig-zag track in the metal coating, thereby forming a plurality of metallized areas spaced apart in the direction of the length of the strip, the marginal portion of the coating extending along one edge of the strip remaining electrically connected to alternate metallic areas whilst the marginal portion of the coating extending along the other edge remains electrically connected to the other alternate metallic areas.

In a simple apparatus of the above type, the necessary increase in the spacings between the successive transverse tracks or pitch may be obtained by varying the rotative speed of the branding wheel and maintaining a constant lineal speed of the strip or by varying the lineal speed of the strip and maintaining the rotative speed of the branding wheel constant.

It will be apparent that if the branding elements were applied so as to burn the transverse tracks at equal intervals apart along the metallized strip and the strip then rolled up, each successive metallized area would lap a smaller proportion of the circumference of the roll, since the said circumference increases with each convolution. The metallized areas would not then register with each other so as effectively to cooperate as electrodes of opposite polarity. Moreover, even if the branding elements were spaced apart at fixed distances to give a predetermined timing of contact with the strip at progressively increasing intervals in accordance with the increase in diameter of the roll, this would only be suitable for producing one particular condenser, i. e. of one predetermined size and capacitance and having a strip of one predetermined thickness and length.

In accordance with the invention, therefore, means are not only provided whereby the branding elements are so timed that the intervals between successive transverse tracks are progressively increased in accordance with increase in the circumference of the roll as the strip is wound up, but the said timing is rendered variable to suit requirements. To this end, the metallized strip may be moved longitudinally relatively to the branding elements by driving means operatively connected through variable speed gearing to actuating cams for operating the branding elements. The cams may advance the branding segments successively into contact with the metallized coating, each segment after completing its operative period, being automatically retracted by a return spring. In this way, by varying the change-speed gear, the time between successive contacts of the branding elements with the strip can be adjusted so as to give any predetermined rate of increase (or decrease) in the widths of successive electrode areas, thus ensuring that each such area will substantially lap the circumference of the roll.

In the rolling of electrical condensers, or in forming other rolls of the paper strip as may be required, it is of course not necessary that the means which time the electrodes be governed by direct mechanical linkage. As will be apparent to those skilled in the art, indirect means such as an electrical circuit which controls the timing in response to a sensed increase in the roll diameter, or in response to a sensed length of paper passage, may also be used.

Instead of, or in addition to, timing the branding elements by the cam mechanism, means may be provided whereby the timing is determined by selectively connecting the branding elements to the source of current supply in accordance with the required spacing between successive transverse tracks. Further, instead of the metallized strip being moved longitudinally at constant speed, the branding elements may be rendered operative successively (by the cam mechanism and/or by selective energization) at equal intervals, whereas the strip is moved longitudinally at a speed (or in steps) progressively increasing in accordance with the increase required for succeeding electrode areas. Here it will be apparent that the branding may be effected in either direction along the strip, that is to say, either progressively to increase or progressively to decrease the widths of successive electrode areas.

Provided that the variable-speed gearing (and/or the means for selectively energizing the branding elements) has a sufficiently wide range of variation with respect to the uniform longitudinal speed of the strip, no limit is imposed upon the length of metallized strip which can be patterned in this way to provide electrode areas of continuously and progressively increasing width, so that the same apparatus is suitable for producing condensers having a wide range of dimensions and capacitances. The range of timing variation is, in fact, only limited by the range of adjustment of the variable speed gear.

Since the longitudinal track burnt by one end limb of each Z-like pattern registers with the adjacent longitudinal track burnt by the preceding branding element, there is available a wide range of mutual adjustment between successive brandings while maintaining continuity of the longitudinal tracks. If, however, this range is to be exceeded, for example towards one end of a strip intended for a condenser of large dimensions and capacitance, intermediate branding elements, in the form of segments or rods, may be provided and may be rendered operative on the strip between successive brandings by the Z-like patterns. These intermediate branding elements, or bridges, thus operate alternately adjacent to opposite longitudinal edges of the metallized strip to bridge any gaps which would otherwise be left between the aligned longitudinal clearance tracks.

If desired, instead of the segments bearing the Z-like patterns, each transverse track, and the two longitudinal tracks extending in opposite directions respectively from the two ends thereof, may be formed by a branding rod, roller or segment extending transversely to the length of the strip and two pointed rods, with slightly rounded ends, extending parallel to the length of the strip. Alternatively, the two last-named rods may be replaced by two rollers of small diameter and narrow tread. Thus, while one of these rods or small rollers is in contact with the metallized coating (and/or is being energized), a continuous longitudinal track will be burnt, and since this contact can be maintained as long as may be required, the provision of additional bridging elements will be rendered unnecessary.

With this arrangement, namely two branding rods or small rollers to burn the longitudinal tracks, and a transverse branding rod, roller or segment to burn the transverse track interconnecting the longitudinal tracks, it is important to avoid burning the transverse track beyond the termination of the immediately preceding longitudinal track since two succeeding electrode areas would thus be left interconnected and the two sets of metallized areas, which are to constitute the electrodes of opposite polarity, would be short-circuited. The transverse track may, however, be burnt so as to join up with the immediately preceding longitudinal track at a point prior to the termination of the latter, and to join up with the immediately succeeding longitudinal track (near the other longitudinal edge of the strip) after the commencement of such succeeding longitudinal track. In other words, precision as to the lengths of the longitudinal tracks is not imposed, provided that two such tracks which succeed each other along and adjacent to one and the same longitudinal edge of the strip do not mutually merge, the widths of successive electrode areas, as measured in the direction of the length of the strip, being determined solely by the spacings between successive transverse tracks.

A patterning of this type, i. e. where the longitudinal tracks project beyond the joining edges with the transverse tracks, has the further advantage that the metallized areas of like polarity are connected to the respective marginal areas or connecting strips through relatively narrow connecting paths or gaps, thus preventing an excessive short-circuiting current as a result of the total condenser charge from passing through a puncture or breakdown point of the dielectric within one of the metallized areas. This, in turn, enables the short-circuiting current to regenerate or burn out the metal around the fault, without danger of burning the dielectric and destroying the usefulness of the condenser.

Instead of employing variable speed gearing between the drive for the metallized paper strip and that for the mechanism controlling the branding elements, the latter may be controlled by means of a perforated control tape of paper or other flexible material. The control tape may be punched with elongated slots whose lengths correspond respectively to the successive operative periods of the branding elements which burn the longitudinal tracks in the metallized coating, a series of centrally disposed openings in the control tape being spaced apart at intervals corresponding to those required between the successive transverse tracks in the coating. The branding elements may be operated either directly by means of actuating fingers which pass through the slots and openings in the control tape, or indirectly through pneumatic, electropneumatic, or electromagnetic means controlled by the said openings and slots. In one form of indirect control, instead of each of the slots described above, the tape may have two perforations spaced apart in the direction of the length thereof, one perforation initiating the advance of the associated branding element into contact with the metallized coating (and/or energization of that element) whilst the second perforation initiates retraction (and/or deenergization) of the element. The control of each of the branding elements can thus be effected in the desired sequence and with the required progressive lengthening of the duration of effective contact for each successive electrode area as compared with its predecessor, in much the same way as the printing members of a type-printing telegraph apparatus are selected and operated by a punched paper tape for high speed work.

A number of control tapes may, therefore, be provided, each perforated in accordance with the dimensions and capacitance of the condenser which it is desired to produce, and in order to pattern a metallized paper strip for producing any desired capacitance, it is only necessary to select the appropriate control tape and to run it through the patterning machine in conjunction with the metallized paper strip. It will be apparent that the dielectric thickness of the metallized paper strip will constitute a factor affecting the capacitance of the rolled condenser, not only directly in that such thickness will determine the radial spacing between successive convolutions of the metallized coating, but also indirectly in that the increase in circumference of any one complete turn of the strip over that of the preceding turn will depend upon the said thickness. The increment of difference between the widths of each pair of adjacent electrode areas should therefore be in accordance with the thickness of the metallized strip. Whereas with known forms of patterning or branding wheels a different wheel is required for each thickness of metallized strip, control by a punched tape as above described permits ready modification to suit metallized paper strips of different thicknesses by merely changing the relative speeds of the control tape and metallized strip through the patterning machine. Adjustment of the track burnt in the metallized coating can thus readily be made to suit the production of a wide range of condensers by means of a gear-change device, the several speed positions of which may be marked with the corresponding metallized strip thicknesses. The gear ratio may be continuously adjustable and may be either adjusted manually in accordance with the thickness of the metallized strip as previously determined, or may be adjusted automatically in accordance with the said thickness as the metallized strip moves into or through the patterning machine. Even small variations in the thickness of the metallized strip will thus be taken into account in determining the widths of the electrode areas formed in the metallized coating. A better yield of condensers within a close capacitance tolerance can thus be obtained, as compared with that obtainable from a branding wheel bearing a fixed pattern and whose spacing is only an average for an average thickness of metallized strip.

If desired, the branding of the pattern in the metallized coating may be combined with the operation of winding the metallized paper strip to form the rolled condenser. The branding elements may be rendered operative and inoperative by electrical or mechanical means actuated by the mandrel upon which the strip is wound, or by a feeler or roller which rests upon the periphery of the roll. Thus, while one metallized strip is being wound, another metallized strip (or another part of the same strip) can be branded in readiness for winding. Control of the branded track in this way obviates the necessity for measurement of the strip thickness since any change in the latter will necessarily be reflected in the diameter and circumference of the roll, and the branded track will thus be controlled accordingly, provided that any changes in the thickness of the strip are gradual and can be neglected along the length of the metallized strip.

As a result, where the patterning or burning away of the metal is controlled directly or indirectly by the winding mandrel of the condenser either mechanically or electrically, the range of sizes or types of condensers that can be produced by using the same machine is practically unlimited. This eliminates the necessity of making expensive and complicated patterning wheels, each for use in producing a single size of condenser and for a definite thickness of the paper or dielectric strips. With the present practice, the requirements call for hundreds or even thousands of different sizes and dimensions and it can readily be seen how the use of a single patterning apparatus according to the invention greatly simplifies the manufacture and reduces the initial investment in equipment and manufacturing costs. In other words, by using the apparatus and method according to the invention, any size or capacity can be made using any type of paper or equivalent dielectric, the capacity being controlled simply by the number of turns which can be adjusted or pre-set in the machine, in a manner customary with automatic condenser winding machines of this and similar types.

The spacing of the perforations in the control tape may, if desired, remain uniform throughout, and the tape may be run through the patterning machine at a progressively decreasing speed so as to give progressively wider electrode areas from one end of the strip to the other. The speed variation of the control tape for this purpose may be obtained by winding the tape on to or off an auxiliary mandrel of the same size as that used, or which is to be used, for winding the metallized strip. The speed of the auxiliary mandrel is directly related to the speed of traverse of the metallized paper strip through the patterning machine so that the two can be geared together either directly or through change-speed gearing so as to allow for variations in the thickness of the metallized strip.

It will be appreciated that any one punched control tape can be used to control the patterning of any width of metallized strip so that rolled condensers can readily be made of differing axial lengths. Condensers having a range of capacitance values, proportional to the overlap widths of the metallized electrode areas, can thus be prepared by the use of a single punched control tape.

In addition to the methods and apparatus mentioned above for effecting the removal of the desired insulating track upon the metallized paper strip in the formation of single web condensers, a simple apparatus employing a single, rod type, branding electrode reciprocably movable transversely across the face of the passing strip may also be employed. In this embodiment the necessary relative motion between the electrode and the passing strip to effect the desired pitch or progressive increase in the spacings between the successive transverse tracks can be obtained by periodically reciprocating the electrode transversely of the strip at constant intervals and progressively increasing the lineal speed of the strip or by maintaining the lineal speed of the strip constant and progressively varying the intervals between successive reciprocation of the electrode thereacross.

Still another embodiment for producing the desired demetallized track pattern on the metallized strip may include a plurality of individual branding electrode rods disposed transversely of the passing strip together with a suitable contact device adapted to reciprocate transversely of the strip and to successively energize the electrode units in succession in its passage thereacross. As in the embodiment described immediately above, the necessary relative motion between the branding electrode system and the passing strip to effect the desired pitch relationship can be obtained by periodically reciprocating the contact device transversely of the strip at constant intervals and progressively increasing the lineal speed of the strip or by maintaining the lineal speed of the strip constant and progressively varying the intervals between successive reciprocation of the contact device across the electrodes.

Referring now to the drawings, more particularly to Fig. 1, there is shown a metallized paper strip 10 provided with a zig-zag shaped insulating spacing track 11 produced by removing or burning away the metal coating by means of suitable electrodes, said track comprising alternate longitudinal sections 12a and 12b near the opposite edges of the strip interconnected by transverse sections 12c. This, in turn, results in alternate electrode areas 14 and 15 being electrically connected by continuous metal strips or marginal areas 16 and 17, respectively. The width $a_1$, $b_1$, $a_2$, $b_2$, $a_3$, etc. of the successive electrode areas increases gradually, as indicated in the drawing, in such a manner that, as the strip is wound upon a mandrel into a rolled condenser unit, the width of each electrode area exactly equals or laps the circumference of the roll, whereby the adjacent areas 14 and 15 of opposite polarity exactly register and cooperate to provide a condenser unit or section.

As will be understood, the widths of the successive electrode areas are dependent both upon the thickness of the paper as well as the size or diameter of the condenser.

Referring to Fig. 2, there is shown a metallized strip with an improved electrode pattern for making paper condensers according to the invention. According to this modification, the longitudinal track sections 12a and 12b are extended beyond the meeting edges with the transverse sections 12c, to ensure a connection between the longitudinal and transverse tracks and to prevent a direct electrical connection between the electrode areas of opposite polarity. Furthermore, this construction results in relatively narrow current paths or gaps 13a and 13b, respectively, between the terminal or connecting strips 16 and 17 and the respective electrode areas 14 and 15. As a result, in case of a puncture or short-circuit of the condenser, especially those using a single layer of paper or dielectric between the electrodes of opposite polarity, an excessive current, as a result of the total condenser charge through the short-circuit point, is prevented, thus enabling the metal coating in the neighborhood of the short-circuit point or fault to be evaporated or removed without danger of destroying the paper, as will be further understood from the following.

As is well known, the underlying thought of the metallized paper condenser consists in the utilization of the electric energy stored in the condenser to vaporize the thin metal layer in the immediate vicinity of a fault or break-down point by the short-circuit current, without destroying the paper insulation, thus providing a sufficiently long insulating path between the layers or electrodes of opposite polarity. This self-healing effect or automatic regeneration has been found practically possible with extremely thin electrodes produced by coating the metal directly onto the paper or equivalent dielectric by a vaporizing or similar process.

If the energy stored in the condenser is considerable, such as in the case of high operating voltage or capacity, the ensuing large short-circuit current or energy may lead to a mechanical destruction of the paper or dielectric. This defect is obviated according to the invention by the special electrode shape, as shown in Figs. 2 to 4, wherein the electrode areas 14 and 15 are connected to the respective marginal connecting strips 16 and 17 through relatively narrow current paths or gaps 13a and 13b, in such a manner as to reduce or prevent an excessive short-circuiting current through a fault or break-down point by the electric charge on the neighboring sections or electrode areas. As a result, the thin metal layer in the vicinity of the fault will be readily evaporated, substantially without danger of the paper being destroyed by the short-circuit current or arc.

Referring to Figs. 3 and 4, there are shown electrode patterns of the type according to Fig. 2 for making condensers with two or three layers, respectively, of paper or dielectric between adjacent electrode areas 14 and 15 of opposite polarity. For this purpose, alternate electrode areas, or alternate pairs of electrode areas of both polarities are omitted or removed in such a manner, as to interpose a desired number of paper layers or turns between any two cooperating electrode areas of opposite polarity in the wound or final condenser unit, in a manner readily understood. In the same manner, the length of spacing areas between adjacent electrodes 14 and 15 may be any multiple of the electrode areas to obtain a condenser having a desired dielectric thickness.

Referring to Fig. 5, there is shown in diagrammatic fashion a patterning system according to the invention using a single branding roller provided with a branding rib or pattern for demetallizing a metallized paper strip according to the invention. The metallized strip 20 or web supplied from a supply or feed roll 20a is passed around a guide and contact roller 21 and over a suitably curved or arcuate support 22 which may be either fixed or preferably in the form of a freely rotatable wheel or roller of metal or insulating material. The strip, with its metal coating facing in an upward direction, is drawn, in the example shown, from the roll 20a at a constant speed by means of a suitable constant speed drive in the form of a pair of friction rollers 24 and 25 of rubber or the like engaging the opposite faces of the strip 20. One of the rollers such as roller 24, as shown in the drawing, is driven by a motor 30, as indicated at 30a, whereby to move the strip 20 at a substantially constant speed past the branding roller 23. The strip may be wound upon a take-up or stock roll 27, also driven by the motor 30, after passing around a further guide roller 26.

In an arrangement of this type, since the strip 20 moves at a constant speed and the diameter of the take-up roll 27 increases constantly, some kind of a yieldable coupling or slippage device 32 is provided between the motor 30 and the take-up roll 27, in a manner as is customary in connection with similar strip or tape winding devices, such as used in motion picture cameras, magnetic tape recording and reproducing apparatus or the like.

The branding roller 23 is driven by the motor 30 through a suitable variable speed transmission 31, to result in an electrode or branding pattern of the strip 20 with gradually increasing distances between the transverse spacing tracks, in the manner shown in Figs. 1 to 4 of the drawing. The special single branding roller being more clearly shown in Figs. 6 and 7 consists of a metal cylinder 40 having a tread provided with a raised rib or pattern 41. The electric current is applied to the roller through a slip ring 34 and sliding brush or contact 35 from a suitable source, such as a direct current generator 36 having one terminal connected to the contact 35 through an electrical resistance 36a. The opposite terminal of the generator 36 is electrically connected with the metal coating upon the strip 20 through the contact roller 21, which for this purpose consists of metal, and a further sliding contact 37, in a manner readily understood. The distance between the surface of the strip 20 and the track or rib 41 upon the roller 40 in its lowermost position is adjusted in such a manner as to cause an electric discharge to pass between the metal coating and the rib 41, thus effecting a demetallizing or burning away of the metal along the continuous zig-zag track or pattern, as the strip is moved at a constant speed past the roller 23.

In an arrangement of this type, the distances between the transverse sections of the track produced are dependent upon the relative motion or speed between the strip 20 and the circumferential speed of the roller 23. Thus, by gradually varying the speed of the roller 23, the distance between the transverse tracks may be varied progressively in a desired manner to result in a final electrode pattern suitable for winding a condenser unit of desired size or capacity. More particularly, the roller 23, at the beginning of the branding operation, is adjusted to rotate at a given initial speed to result in a desired spacing between the transverse sections of the track depending upon the initial diameter of the condenser roll into which the strip is to be wound, which initial speed is increased gradually to result in a progressively increasing spacing distance between the transverse track sections, in the manner shown in Figs. 1 to 4.

This will be further understood by reference to the graph shown in Fig. 10, wherein the abscissa or X-axis $t$ represents time and the ordinate or Y-axis $s$ represents speed. The speed of the strip or paper 20 is constant as shown by the line $s_p$ being parallel to the X-axis, while the speed $s_r$ of the roller 23 is shown to decrease gradually from an initial value, in such a manner as to result in a gradually decreasing relative speed $d_s$ between the paper and the roller and a corresponding increase of the spacing distances between the transverse track sections, it being readily seen that the smaller the relative speed $d_s$ between the paper and the roller, the greater will be the distance between the transverse tracks produced and vice versa.

The same applies when using a branding pattern of the improved type according to Fig. 8A or a pattern for a double-layer or dielectric thickness condenser according to Fig. 8B, corresponding to the electrode patterns according to Figs. 2 and 3, respectively.

The variable speed control device 31 may take various practical forms readily understood by those skilled in the art. Thus referring to Fig. 9, the control may be purely mechanical, comprising a pair of conical pulleys 44 and 43, the former being driven by the motor 30 and the latter driving the branding roller 23. The pulleys are connected through a driving belt 45 which is gradually moved in a direction transverse to the axis of the pulleys by means of a slidable shifting element or fork 46, to result in a progressively varying speed of the roller 23 relative to the speed of the motor 30 driving the paper strip 20, Fig. 5. The control of the shifting device 46 may be effected in any suitable manner, such as by means of a lead screw 48 cooperating with a travelling nut 47 forming part of the element 46, said lead screw being controlled by the motor 30 through a reduction gearing shown in the form of a pair of spur gears 50 and 51 for simplicity of illustration. As is understood, the reduction gearing may comprise a complete gear train, a differential reduction gearing or any other equivalent device for translating the relatively high speed rotary motion of the motor 30 into relatively low speed translatory motion of the shifting member 46. Alternatively, a cam mechanism or the equivalent may be employed in place of the lead screw arrangement, to effect a gradual change of the speed of the roller 23.

The paper strip, after branding or patterning in the manner described, may be wound upon the take-up or stock roll 27, Fig. 5. In the case that the latter is large enough as to accommodate a plurality of lengths or sections suitable for winding a number of condensers, means may be provided in the form of a rotation counter or the like cooperating with a cam, contact mechanism, to return the variable speed transmission device to its initial position upon completion of the patterning of a given length of the paper strip suitable for winding a single condenser unit or section, whereupon the system is returned to a position for branding a further paper length or section in a similar manner. In an arrangement of this type, further means in the form of an additional branding roller or electrode (see Figs. 27 and 28) may be provided for completely removing the metal coating over a desired length between the successive condenser sections, to provide suitable insulating leader and trailing ends for the various lengths or sections.

If the branded paper strip is wound upon a stock roll for later use, it may be necessary to rewind the roll, before starting winding of the condenser section or sections. This rewinding may be avoided, by reversing the control of the branding elements, that is by starting the patterning at the end of a length or section or with the spacing between the transverse tracks progressively decreasing instead of increasing, while the branding proceeds. As a result, upon winding of the condenser section directly from the stock roll, the successive electrode areas will be in register and result in a properly wound condenser unit, provided a proper timing or branding current control, as will be readily understood. In the arrangement according to Fig. 5, this can be easily obtained by reversing the speed change of the roller 23 so as to gradually increase from an initial to a final value instead of the decreasing speed, as shown in Fig. 10.

Fig. 11 is substantially identical to Fig. 5 except for the omission of the constant speed drive 24, 25 and the yielding coupling or slippage device 32. As a result, the paper strip 20, being wound upon the take-up roll 27 driven by the motor 30, moves with a gradually increasing speed $s_p$, Fig. 12, past the branding roller 23, due to the increasing diameter as the strip is wound into the roll 27. In this case, the variable speed drive 31 is so designed and adjusted as to produce a gradual decrease of the initial speed $s_r$ of the roller 23, to result in a progressively decreasing relative speed $d_s$, in substantially the same manner as in the previous embodiment.

Figure 12:
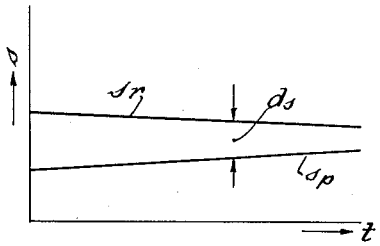
Fig. 12 is a graph explanatory of the function of Fig. 11.
Figures 13, 14:
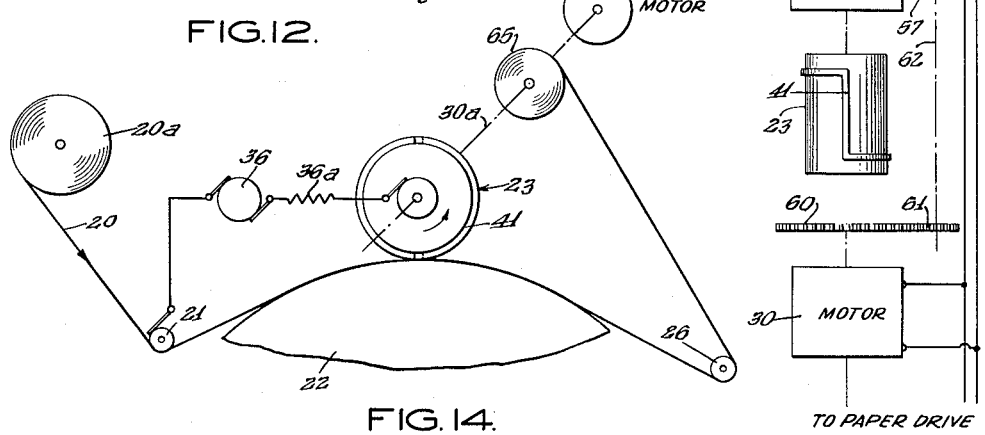
Fig. 13 shows diagrammatically an electrical variable speed drive suitable for use in connection with the invention.
Fig. 14 shows an arrangement similar to Fig. 5 cooperatively connected with the winding of a final condenser unit.

Referring to Fig. 13, there is shown, by way of example, an electrical variable speed drive for controlling the speed of the branding roller, in place of the mechanical speed control shown in the prevous illustration. According to this embodiment, the paper strip is driven by an electric motor 30 as in the previous arrangement, said motor being energized from a network 55 which also feeds an auxiliary motor 56, preferably a direct current motor, through a variable speed control resistor 57. The latter is advantageously connected in the shunt or field circuit of the motor 56, thus enabling a progressive speed control, in a manner well understood. The motor 56 drives the branding roller 23, while a speed reduction gearing 60, 61 connected to the motor 30 and being equivalent to the gearing 50, 51 of Fig. 9, serves to operate the speed control resistor 57 through a suitable connection or coupling 62, to result in a variable relative speed between the branding roller and paper strip, in substantially the same manner as shown in Figs. 10 and 12.

Figure 15:
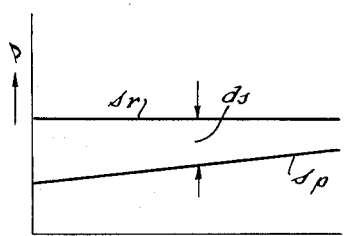
Fig. 15 is a graph explanatory of the operation of Fig. 14.

According to a simplified modification, as shown in Fig. 14, the metallized paper strip 20, after passing the patterning device, is immediately wound, in a continuous operation, upon a mandrel into a final condenser unit 65, i. e. the patterning and winding operations are carried out in a single operation. In this case, the paper strip again moves with a gradually increasing speed $s_p$, Fig. 15, as the section 65 is being wound, whereby the constant speed $s_r$ of the roller 23 directly or indirectly driven by the winding mandrel results in a relative speed variation $d_s$ and in turn in a proper spacing of the transverse tracks burnt upon the strip as required for the winding of the section or unit 65.

In arrangements according to Fig. 14, the spacing between the transverse tracks of the zig-zag pattern, while increasing as the strip is wound into the roll 65, depend also upon the diameter or circumferential speed of the branding roller 23 or dimensions of the branding rib 41. By the proper design of the roller, the electrode pattern produced will be such as to cause the electrode areas of opposite polarity to lap or register in the wound unit, in the manner pointed out. Alternatively, a speed-change drive or gearing may be interposed between the winding mandrel and branding roller or equivalent control device to accomplish the same result, as will be readily understood.

As pointed out hereinbefore, in methods and arrangements as shown in Fig. 14 where the patterning is directly or indirectly controlled by the winding mandrel or motor, both the length and thickness of the paper strip are of no consequence, thus enabling the production of any size or type of condenser of practically unlimited range by the same machine.

In the preceding embodiments, a branding or patterning device in the form of a roller has been shown containing a complete "repeat" or branding track, the increasing distances between the transverse track sections being achieved by a varying relative speed between the branding device and the paper strip being patterned. According to another modification of the invention, as pointed out above, a number of separate, i. e. three or more, branding elements or electrodes are provided in relatively fixed relation and either successively moved or advanced into operative position by means of a mechanical control device or connected to a current source through a suitable contacting and timing mechanism, to successively burn the longitudinal and transverse track sections which together form a continuous zig-zag track, in a manner further understood from the following.

Figure 16:
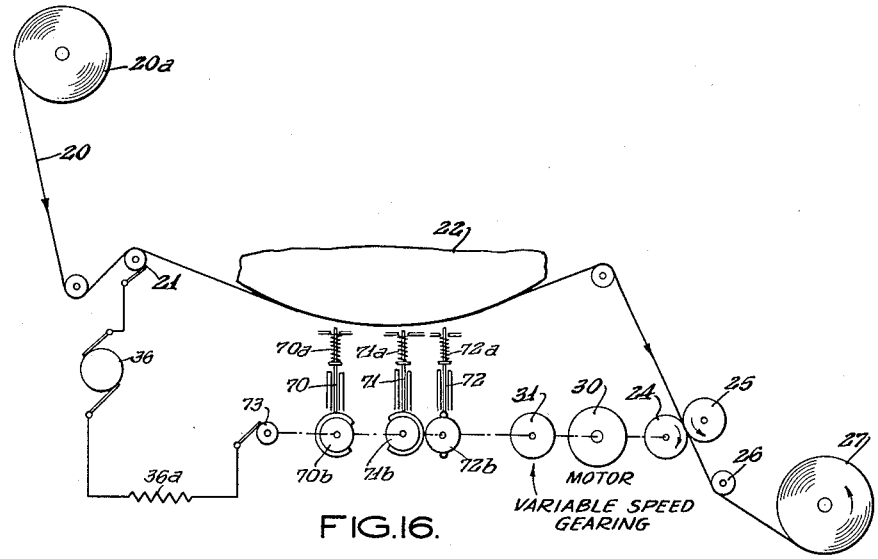
Fig. 16 shows a modification of an electrode patterning system according to the invention, employing separate branding elements or electrodes for producing the sections of the zig-zag shaped spacing track and a mechanical timing and control device for successively moving said elements to and from operative position.
Figure 17:
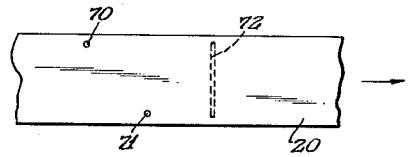
Fig. 17 is a top view of the paper strip and branding electrodes shown in Fig. 16.

A simple arrangement of this type using a paper strip driven at constant speed is shown in Figs. 16 and 17. In the latter, there are shown three slidable branding electrodes 70, 71 and 72 arranged at spaced and fixed distances from each other. Electrodes 70 and 71 consist of a pair of rods having round ends and arranged substantially perpendicular to the plane of the strip 20, for burning the longitudinal track sections, while the electrode 72 has a T-shaped form comprising a transverse end or bar for burning the transverse track sections. The rods or electrodes 70, 71 and 72 normally being urged away from the paper strip by means of suitable biasing springs 70a, 71a and 72a, respectively, are successively advanced into operative position towards the paper strip by means of cams 70b, 71b and 72b mounted upon a common shaft and driven by the motor 30 through a variable speed gearing or transmission device 31. The latter as well as the constant speed drive 24, 25 are substantially similar to the equivalent items shown in Fig. 5.

Cams 70b, 71b and 72b are provided with suitably designed raised portions or cam surfaces, whereby to first raise the rod or electrode 70 to burn a first longitudinal track near one edge of the strip 20 as the paper strip moves past the electrode. Rod or electrode 71 is lifted by the cam 71b prior to the release of the electrode 70 to burn the longitudinal track along the opposite edge of the strip 20, while the rod 72 is lifted and released briefly at intermediate positions by the proper shaping of the cam 72b, to produce transverse spacing tracks and to result in a final pattern or track of the type shown in Fig. 2, as will be readily understood. Again, the speed of the strip 20 and cams 70b, 71b and 72b and the spacing between the electrodes 70, 71 and 72 may be so related or adjusted as to result in an electrode pattern suitable for producing a condenser of desired size or capacity.

In order to complete the electric circuit, cams 70b, 71b and 72b are provided with a common slip ring 73 and sliding contact connected to one terminal of the current source 36 through an electrical resistance 36a, the remaining terminal of the source 36 being connected to the contact roller 21.

Figure 18:
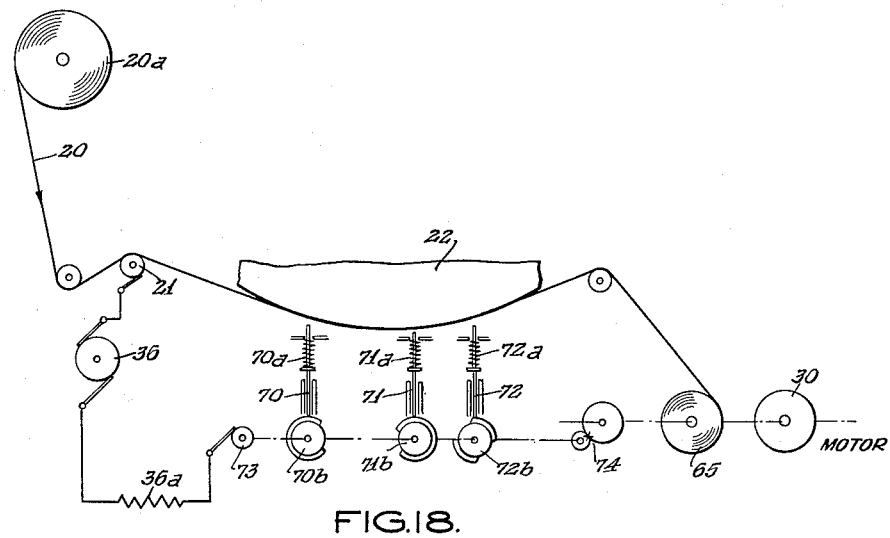
Fig. 18 shows a modification of an arrangement according to Fig. 16, for branding and simultaneously winding a paper strip into a condenser unit having a double paper dielectric thickness.

Fig. 18 shows a system similar to Fig. 16, differing from the latter by the design of the cam 72b to effect an alternate burning out of a full electrode area, to produce a pattern for a condenser having a double paper or dielectric thickness, as shown in Fig. 3. In Fig. 18, the paper 20 is shown directly wound upon a mandrel into the final condenser section 65 by the winding motor 30, thus dispensing with any constant speed drive for the paper and variable speed control device. The increasing speed of the paper strip, as the section is wound upon the mandrel 65, results in a proper spacing of the transverse tracks by the design of the cams 70b, 71b and 72b, substantially independently of the paper thickness, as will be readily understood from the foregoing. In order to arrive at a suitable spacing between the electrodes 70, 71 or 72, a speed change drive or gearing 74 is shown connected between the mandrel or driving motor and control cams 70b, 71b and 72b.

Arrangements according to Fig. 16, wherein the speed of the paper strip is constant have the advantage that the width of the transverse track sections remains constant throughout the length of the paper strip, while in the case of varying relative speed between the branding elements and the paper strip, the width of the transverse tracks may vary, especially in case of condensers of large capacity or diameter.

Figure 19:
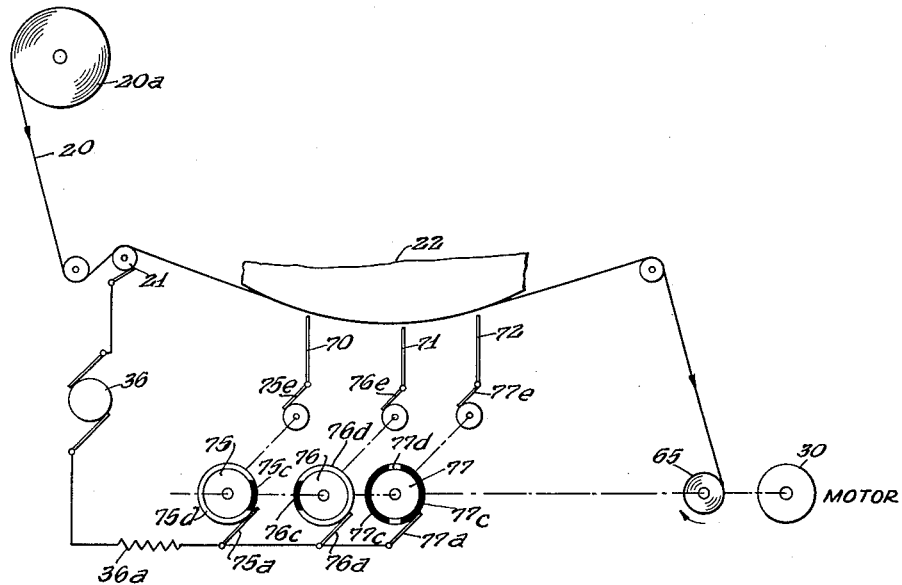
Fig. 19 shows another modification of Fig. 16, using fixed branding elements and an electric timing or control device in the form of rotary contacts or commutating devices, the branded strip being simultaneously wound into a condenser unit.

Fig. 19 shows a modified arrangement of the type according to Fig. 16, wherein the branding electrodes 70, 71 and 72 are arranged at fixed distances from the paper strip to produce a spark by the application of a suitable potential difference, the successive operation or burning of the longitudinal and transverse tracks being controlled by a multiple switching or commutating device operated by the winding motor. There are shown for this purpose, in the example illustrated, three rotating commutators 75, 76 and 77 mounted upon a common shaft and driven by the mandrel or winding motor directly or indirectly in any suitable manner, as indicated schematically in the drawing. The commutators cooperating with sliding contacts or brushes 75a, 76a and 77a which are connected to one terminal of the generator 36, are provided with insulating sections or segments 75c, 76c and 77c and conducting segments 75d, 76d and 77d, respectively. The electrodes 70, 71 and 72 are in turn connected to the commutator outputs through further slidable contact devices 75e, 76e and 77e, in a manner readily understood. The insulating and conducting sections of the commutators are so designed, as shown in the drawing, as to result in a successive closing of the circuits for the branding electrodes and burning of the longitudinal and transverse tracks in substantially the same manner as by the use of mechanical timing and control elements according to Figs. 16 to 18.

In Fig. 19, the branded paper is again directly wound into a condenser section 65, thus dispensing with any constant speed drive for the paper and variable speed control of the commutators. Again the spacing between the electrodes 70, 71 and 72 and/or the speed and design of the commutators 75, 76 and 77 are so related or adjusted as to result in the proper electrode pattern required for the winding of the condenser roll 65. It is understood, however, that the paper may be moved at a constant speed and the commutators controlled through a variable speed drive, or vice versa, as shown in the preceding embodiments.

In place of the rotating commutators, Fig. 19, any equivalent timing and contacting mechanism may be provided for the purpose of the invention. Thus, referring to Figs. 20 and 21, the rotating commutators are replaced by an endless insulating control tape 80 continously moved around a pair of sprockets or guide rollers 81 and 82. The tape is provided with slots or openings 80a, 80b and 80c which cooperate with suitable sliding contacts or feelers 83, 84 and 85, respectively, arranged at one side of the tape and a common electrode or plate 86 arranged at the opposite side of said tape, in such a manner as to effect a successive timing of the branding currents through the electrodes 70, 71 and 72, in substantially the same manner as when using rotary contacting devices. In the drawing, the sliding brushes or contacts 83, 84 and 85 are shown spaced in the lengthwise dimension of the tape 80 for better illustration, it being understood, however, that these contacts may be arranged in a row transverse to the tape.

Figure 20:
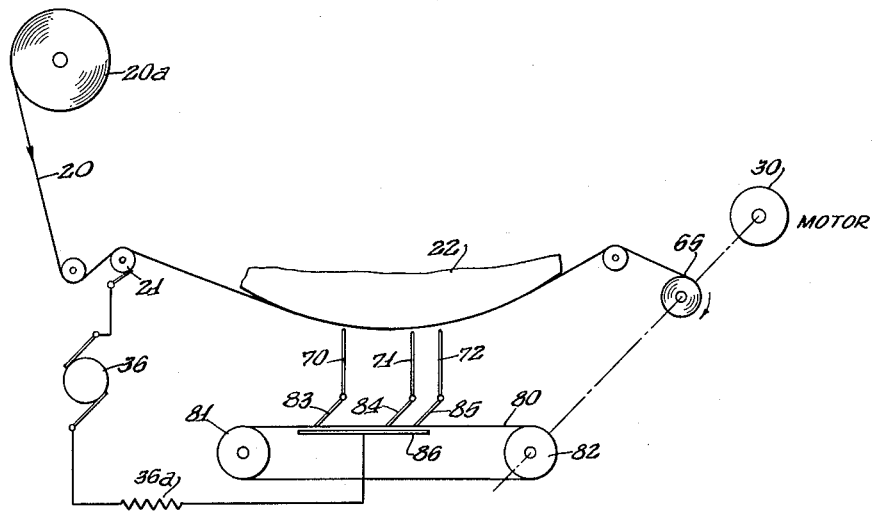
Fig. 20 shows a modification of Fig. 19, using a perforated control tape and cooperating contact elements for timing the branding current pulses.
Figure 21:
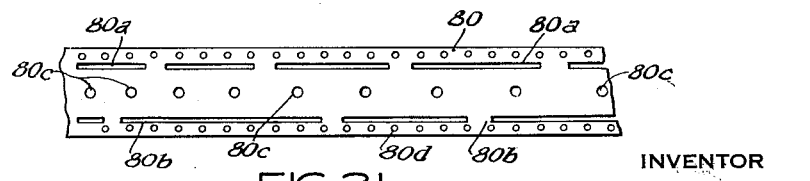
Fig. 21 shows a perforated control tape suitable for use in connection with Fig. 20.

Again, in Fig. 20, the paper strip 20 is shown to be wound directly into the final condenser roll or section 65 upon leaving the patterning apparatus, the endless control tape 80 being directly or indirectly driven by the winding mandrel or motor 30. In this case, the perforation pattern of the tape 80 suitably driven by sprocket wheels cooperating with sprocket holes shown at 80d, in a manner customary with motion picture apparatus, has a constant "repeat," the variable timing of the branding currents being effected by the increasing speed of the paper strip 20, as the latter is wound into the roll or section 65. It is understood, however, that the paper may be driven at a constant speed and the "repeat" upon the control tape 80 may vary, to result in a desired final pattern of the strip leaving the branding apparatus, for either direct winding into a condenser section or winding upon a take-up or stock roll for later use.

According to an alternative arrangement, a plurality of perforated tapes may be provided, one for each type or size of condenser and having perforation patterns which substantially conform to those required for the particular size or type condenser. In other words, the tape perforation pattern is a substantial replica of the corresponding condenser electrode pattern, whereby all that will be required in such a case is to store a sufficient number of patterning tapes, one for each type and size of condenser, which tapes may be of small size and bulk and can be quickly inserted and removed from the patterning apparatus for producing condensers of a desired type and capacity.

In such an arrangement, as shown in Figs. 22 and 23, the tape 80 may be wound from its supply spool 87 to a take-up spool 88 simultaneously and synchronously with the winding of the paper take-up roll 27 by the motor 30. In case of smaller condensers or sections, one stock roll and corresponding tape may contain repeating sections of definite length, each designed to serve for the winding of a single condenser of a desired capacity and provided with perforations so designed or patterned as to result in a number of identical lengths or equally patterned sections of the completed supply roll, suitable for winding into individual condensers of desired size or capacity.

As will be understood, in place of a perforated tape and direct contact control, the control tape may be provided with a pattern printed thereon and the control currents produced by photo-electric or equivalent pick-up devices of any type well known in the art.

Referring to Fig. 24, there is shown still another modification using a perforated tape as a timing and control device for the branding electrodes 70, 71 and 72 normally biased away from the coated paper surface and advanced into operative position electrically by means of solenoids 90, 91 and 92, respectively, which are energized by a suitable current source such as a battery 93 through the tape contacts 83, 84 and 85, in a manner readily understood from the foregoing. The branding electrodes 70, 71 and 72 are again connected to one terminal of the voltage source 36 by way of flexible connecting leads 90a, 91a and 92a, the circuit being completed between the other terminal of the source and the metal coating through the contact roller 21, in a manner similar to the preceding embodiments. Again, the paper may be driven at a constant speed and the speed of the tape varied to control the branding pattern, or either or both the paper and tape may be moved at a relatively varying speed in a manner readily understood from the foregoing.

Referring to Figs. 25 and 26, there is shown a modified patterning apparatus of the type according to Fig. 5 especially suitable for patterning strips for producing condensers of large size or diameter. For this purpose, there are provided two spaced branding rollers 95 and 96, each having a Z-shaped rib or raised portions 95a and 96a representing one of the consecutive transverse tracks and adjacent portions of the longitudinal tracks, i. e. one-half of a complete "repeat" of the zig-zag track to be patterned. The rollers 95 and 96 are again connected to a voltage source through a suitable contact or timing device of any type shown herein, whereby the longitudinal section produced by one roller variably overlaps the adjacent longitudinal section produced by the other roller, resulting in a continuous zig-zag track, as is readily understood. In case of especially large condensers or distances required between the transverse tracks, additional intermediate branding rollers 97 and 98 may be provided to insure continuous longitudinal tracks for the largest size or type of condenser for which the apparatus is designed.

Figure 27:
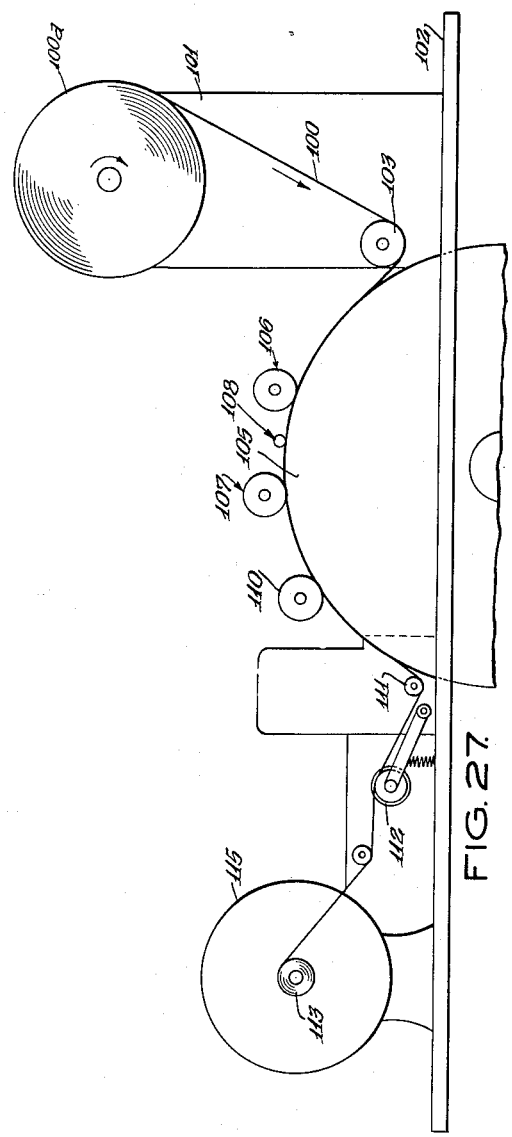
Fig. 27 shows a side view of a combined patterning and condenser winding apparatus using fixed branding electrodes and branding current control by means of rotating commutating devices for simultaneously producing a plurality of condenser units.
Figure 28:
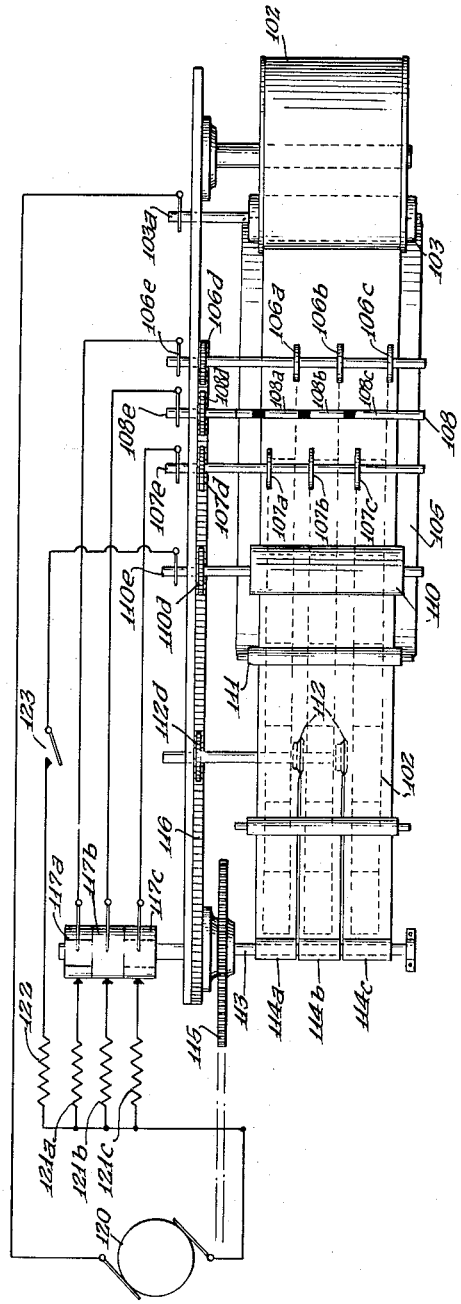
Fig. 28 is a top view of Fig. 27.

Referring to Figs. 27 and 28, there is shown a complete patterning and condenser winding machine for simultaneously fabricating a plurality of condenser units or sections from a supply roll of metallized paper. The metallized paper strip 100 of relatively large width is supplied from a feed roll 100a rotatably mounted upon an upright bracket or support 101 at right angle to a base 102. The strip 100, after passing around the contact roller 103 is led over a support in the form of a rotatably mounted wheel or roller 105 corresponding to item 22 in the previous illustrations.

In the arrangement shown, the branding electrodes are in the form of rotating discs or rollers 106, 107 and 108 for burning the longitudinal and transverse tracks, respectively. It is understood, however, that stationary electrodes may be used, as shown in preceding illustrations. After the patterning operation, the paper strip passes a further branding roller 110 extending over the entire width of the strip and serving to produce insulating leading and trailing ends of the strip or partial lengths thereof required for winding a condenser unit. The strip is then passed around a further guide roller 111 to a multiple rotary cutter 112 for slicing it into a plurality of partial strips, three being shown in the drawing, which are then simultaneously wound upon a common mandrel 113 into a corresponding number of rolled condenser units 114a, 114b and 114c, respectively.

The mandrel 113 is driven by a suitable source such as an electric motor (not shown) through a driving gear 115 which also operates a chain drive 116 or the like and a number of commutators or rotary contacting devices 117a, 117b and 117c. The drive 116 serves to rotate the branding electrodes 106, 107, 108, 110 as well as the cutter 112 by way of suitable driving gears 106d, 107d, 108d, 110d and 112d, respectively.

The electrode 106 comprises three branding wheels 106a, 106b and 106c of narrow tread for producing the longitudinal tracks near one edge of the final strips and is connected to the output of commutator 117a through a sliding contact 106e. Similarly, the electrode 107 comprises three branding wheels 107a, 107b and 107c for producing the longitudinal tracks near the opposite edge of the final strips and is connected to the output of the commutator 117c through a sliding contact 107e. The electrode 108 for burning the transverse track is provided with suitable conducting sections 108a, 108b and 108c, insulatingly spaced from each other and is connected to the output of commutator 117b through a sliding contact arrangement 108e. The input terminals of the commutators 117a, 117b and 117c are connected to one pole of the direct current source 120 through individual series resistors 121a, 121b and 121c, respectively, while the branding roller 110 is connected to the same terminal of the source 120 through a further resistance 122, a contact or switching device 123 and sliding contact arrangement 110e. The contact roller 103 is connected to the opposite terminal of the source 120 through a sliding contact arrangement 103a, to complete the circuits for the branding currents.

Thus again, by the proper design of the commutators 117a, 117b and 117c and relative spacing of the branding electrodes or rollers 106, 107 and 108 and, if necessary, a speed change transmission between the winding mandrel 113 and the commutator shaft, a burning of the proper electrode pattern upon the final partial strips may be achieved, in such a manner as to cause the electrode areas of opposite polarity to overlap exactly or register in the wound rolls or final condenser units 114a, 114b and 114c. In order to adapt the device for various sizes, paper thicknesses, and/or to suit other existing conditions and requirements, the spacing between the branding electrodes 106, 107 and 108 and the speed of the commutators 117a, 117b and 117c may be adjustable within limits. The switch 123 may be controlled either manually or automatically, such as by means of a revolution counter, travelling nut mechanism or the like driven by the winding mandrel, to effect the burning of the leading and trailing end portions of the paper strip or fractions thereof for condenser units of desired size or capacity.

In the foregoing, it has been assumed that the electrode areas of opposite polarity lap or extend over a complete circumference or convolution of the wound roll, whereby to result in a given sub-division of the total electrode area into a number of partial areas or electrodes. If a greater sub-division is required or in order to achieve any other purpose, the patterning, according to a modification of the invention, may be carried out in such a manner as to cause electrode areas extending over or lapping only a fractional portion of the circumference to register in the wound roll or final unit.

A strip patterned in this manner is shown in Fig. 29 which differs from Fig. 2 in that the total widths $a_1$, $a_2$, $a_3$, etc. of adjacent pairs of electrode areas 14 and 15 correspond or lap a full circumference of the rolled unit. In this case, the sequence of positive and negative areas or of the connection of the electrode areas with the marginal strips 16 and 17 is reversed from turn to turn, or in other words, adjacent pairs of areas of like polarity 14 and 15 are connected to the same marginal strips, respectively, as shown in the drawing.

The same applies for a condenser having a double paper thickness and using an electrode pattern as shown in Fig. 30. In the latter, areas 19 corresponding to a full turn or convolution are burned between each two adjacent areas of like polarity. If desired, similar patterns may be produced with the electrode areas covering fractional portions less than one-half of the circumference of the wound roll and areas greater than a single turn or convolution may be burned, to obtain a corresponding number of dielectric layers in the final condenser as will be readily understood.

Electrode patterns of the afore-described type having a somewhat complicated configuration compared with previously described methods, are advantageously produced by means of a control tape having a pattern corresponding to the desired electrode shape, in a manner described and understood from the foregoing.

Fig. 31 illustrates schematically a condenser obtained by winding a strip shown in Fig. 29 upon a mandrel into a convolute spiral unit. As is seen, the positive and negative electrode areas 14 and 15 indicated in dotted lines extend over one-half of the circumference of successive turns or convolutions, to form a complete operative condenser unit. Fig. 32 shows the same condenser wound with a strip according to Fig. 30 with alternate burnt or free areas or turns 19 interposed, to result in a double layer dielectric.

Fig. 33 shows, for sake of comparison, a unit having electrode areas lapping a full circumference as shown in Fig. 2.

A relatively simple and inexpensive method of obtaining the desired pattern on the metallized strip can be obtained by using a single rod type electrode reciprocable transversely of the passing strip. One such type of apparatus is schematically illustrated in Fig.

35. As there shown, there is provided a mounting block 150 positioned above the passing metallized strip 151. Disposed within the block 150 is a vertical slot 152 positioned transversely to the strip 151 and sized in accordance with the length of transverse track desired. Disposed within the slot 152 is a vertical rod type electrode 153 suitably connected to the demetallizing potential. The block 150 is adapted to be rigidly positioned above the passing strip 151 and suitable means, not shown, are provided to reciprocate the rod type electrode 153 transversely of the strip within the slot 152.

In operation of this device a longitudinal track adjacent one edge of the passing strip is effected while the rod type electrode 153 is positioned adjacent one of the extremities of the slot. The transverse track is obtained as the electrode 153 is moved relatively rapidly lengthwise of the slot and to a position adjacent the other end thereof. When the electrode 153 is positioned adjacent the other end of the slot, the longitudinal track adjacent the other side of the passing strip will be formed. In actual operation the transverse track 154 is substantially perpendicular to the longitudinal tracks 155, 156, as the rate of paper advance is relatively small as compared to the relatively rapid rate of displacing the electrode rod 153 from one side of the slot 152 to the other.

The means for reciprocating the electrode rod 153 may conveniently be such as to provide a periodic reciprocation thereof at constant intervals. In association therewith and to provide the necessary progressively altered pitch of the pattern, the rate of paper advance past said electrode rod may be such as to progressively increase, as by directly winding on a mandrel and allowing the circumferential build-up of the roll to effect the necessary progressive increase in the lineal speed of the strip past the electrode. In contradistinction therewith, the progressively altered pitch of the pattern may also be effected by maintaining a constant paper speed past the electrode and progressively varying the rate of reciprocation of the electrode rod. Such a control of the periodicity of the movement of the electrode rod could readily be obtained by a direct mechanical connection to the winding mandrel, as explained in detail in several of the heretofore described embodiments.

Another relatively simple and inexpensive type of apparatus by which the methods of this invention may be employed is shown in Fig. 36. In this embodiment there is also provided a mounting block 160 disposed above the passing strip 161. Contained within a slot 162 in the mounting block are a plurality of rod type electrode units 163 disposed closely adjacent but insulated from each other. In operation of this embodiment a reciprocable contact device 164 is adapted to move over and successively contact and/or depress the individual electrodes into sparking contact with the strip. The contact device 164 is provided with a raised abutment 165 suitably shaped so as to contact and/or successively depress the electrode rods 163 individually.

In operation of this device contact with and/or depression of the end-most electrode rod contained within the slot 162 will result in the production of the longitudinal track adjacent one side of the passing strip. In order to form the transverse track, the contact device 164 is reciprocated transversely of the strip and in its passage thereacross successively contacts and/or depresses each of the electrode rods into sparking contact with the strip. When it reaches the other extremity of the series of electrode rods and is caused to dwell at said location, it will result in the production of the longitudinal track adjacent the other edge of the passing strip.

As was the case with the embodiment illustrated in Fig. 5, the necessary progressive variation between the transverse spacings or the progressively altering pitch of the electrode areas may be obtained by periodically reciprocating the contact device 164 at constant intervals and varying the rate of strip advance, as for example by winding it on a mandrel and letting the circumferential increase in roll build-up effect the necessary increase in lineal speed. The desired progressively altering pitch may also be obtained by maintaining the lineal speed of the strip past the electrode units at a constant value and progressively varying the rate of reciprocation of the contact device 164 by a suitable mechanical linkage, as for example to the winding mandrel.

Another and more simplified embodiment is illustrated in Figs. 37 and 38. There is provided a patterning electrode 170 which may suitably and simply be a relatively rigid wire connected to the demetallizing potential. The electrode 170 is mounted on an arm 171 in such manner that the extending length thereof can be increased or decreased by a simple adjustment such as may be effected by the positioning set screw 172. The arm 171 and the electrode 170 are conveniently mounted by means of a bearing 173 to a fixed base 174, the base 174 being such as to be rendered adjustable in position and then permanently clamped in the desired position. The arm 171 is pivotally mounted on the bearing 173 and is adapted to be rotated through a predetermined arc, either electromagnetically through solenoids 175 or by suitable magnets 176 disposed adjacent the contact end of the electrode units.

In operation of this embodiment the longitudinal track adjacent one side of the passing strip is obtained when the arm and electrode unit mounted thereon is positioned at one of the extremities of its pivotal movement. The transverse track is readily effected by pivotally rotating the arm 171 to its other extremity, at which location the other longitudinal track is formed.

The progressively altered pitch of the electrode areas on the metallized strip may be effected, as was in the case above, by pivotally rotating the arm 171 at constant intervals and progressively increasing the rate of paper advance therepast, as for example by winding the strip on a mandrel and permitting the circumferential build-up of the roll to effect the necessary variation in lineal speed. Alternatively the lineal speed of the paper may be maintained at a constant value, and the periodic reciprocation of the arm 171 may be progressively varied by a suitable mechanical or electro-mechanical connection to the winding mandrel.

Throughout this specification, where the branding element has been described as being brought into "contact" with the metallized coating, this is to be interpreted more as a close approach than actual physical contact. To secure adequate burning away or branding of the metallized coating there must be a passage of small sparks or arcs between the coating and the branding element. A minute separation of the coating and element thus appears to be necessary, whether obtained by their actual spacing apart or by progressive burning away of the coating from the edges of the pattern on the branding element, or from the point of mechanical contact so that a small spacing is obtained for maintaining the arcing. In some instances, however, it may prove more practical to bring the branding element into actual contact with the metallized coating so as to start the flow of electric current and then to retract the branding element slightly. Alternatively, actual physical contact may be avoided, and a surge or transient at increased voltage may be applied across the gap to initiate current flow which will thereafter be maintained by the normal D. C. supply at, say, 400 to 600 volts.

In arrangements of the type described, wherein a varying relative speed between the paper strip and branding control device is utilized for varying the distance between the transverse track sections, in particular where the control device is directly or indirectly operated from the winding mandrel, the width of the transverse tracks increases as the roll diameter increases, especially in the case of large rolls or capacities, since the greater the speed of the strip moving past a fixed electrode as the winding diameter increases, the wider will be the track burned, provided a current pulse or control of constant length or duration. In order to keep this variation of the width of the transverse tracks within limits or to automatically maintain the width of the tracks at a constant value, the length or timing of the branding currents or equivalent controls may be varied in dependence upon the winding diameter, in such a manner as to reduce the period of the current applications as the winding progresses or the diameter increases gradually.

An arrangement of this type is illustrated schematically in Fig. 34, wherein the paper strip is wound into the condenser unit 65 in a manner similar to previous illustrations. The control of the transverse tracks is effected, in the example shown, by a cam 130 directly or indirectly driven by the mandrel 65 and having a nose or projection 131 adapted to engage a spring member, in the form of a resilient blade or the like 132, which serves to operate a micro-switch 133 of known construction. The latter controls the branding current for producing the transverse track sections, in a manner shown and described with reference to previous illustrations. Control member 132 is additionally biased by a roller or rider attached to the arm 134 of an angular lever pivoted at 135 and having a further arm 136. The latter also has a roller or rider at its free end resiliently urged against the outside of the winding roll 65. As a result, as the diameter of the latter increases during the winding of the condenser, the member 132 will be biased away from the cam 130, thus causing a reduction of the closing periods of the micro-switch and corresponding decrease of the branding current applications, to thereby counteract the increase in width of the transverse tracks as the winding of the condenser is continued.

The term "zig-zag shaped" as used in the specification and claims to define the insulating track burned upon the metallized strip is intended to define broadly a demetallized track consisting of longitudinal and transverse sections of substantially equal width, Figs. 2 and 29, as well as tracks where the transverse portions or sections have a width equal or being a multiple of the electrode area, Figs. 3, 4 and 31, to produce condensers having a multiple dielectric layer, in the manner described in detail hereinabove. In other words, the zig-zag shaped insulating track results in interlocking alternate electrode areas of opposite polarity registering in the finally wound unit and being separated either by narrow transverse track sections to obtain a single paper condenser or being separated by transverse insulating or demetallized areas equal to or a multiple of the width of the electrode areas, to obtain a multiple paper condenser.

As is understood, the metallized paper used may be of any type coated by condensing a suitable metal, such as zinc, cadmium, aluminum, etc., by a vaporizing process or in any other suitable manner. The paper may be coated by a very thin layer of lacquer to increase the breakdown strength and to obtain a more uniform dielectric thickness. Furthermore, the metallized paper may be subjected to an electric burn-out test by passing it over one or more metal cylinders with the metallized side out and applying an electric potential, preferably in impulse form or during short time periods, to remove defective spots or short-circuits in the manner described hereinabove. This burn-out operation may be combined with the patterning and/or winding operations and a final burn-out test may be given to the completed unit or condenser. In this manner, metallized paper webs of substantial width may be coated, metallized, subjected to a preliminary burn-out, patterned and sliced into partial strips of equal or different width and finally wound into a plurality of condenser units. This enables a mass production of metallized condensers on a large scale and at greatly reduced manufacturing cost.

In arrangements of the type where stationary demetallizing electrodes are used, as shown in Figs. 19, 20 and 22, it may be difficult to insure the maintenance of the demetallizing sparks at the small fixed areas or points presented by the electrodes, even when using electrodes in the form of small wheels or rollers. In order to overcome this difficulty, according to an improved feature of the invention, the said point or rounded edge electrodes are kept in vibration with a small amplitude so as to continuously approach and move away from the metallized surface of the paper by a few thousandths of an inch and at a sufficiently high rate, thus insuring a more regular spark or discharge for demetallizing or burning away the respective metal areas.

By the application of such a small vibratory movement of the electrodes, it is possible to eliminate the uncertainty of operation due to slight inaccuracies and variations of the distance between the electrodes and the metal coating and at the instance when the current supply is switched on and off to the electrodes. When the electrodes are stationary, this may be accomplished in a simple manner by resiliently mounting the electrodes upon separate or a common resiliently mounted support and subjecting the support or supports to the vibratory action of an electro-mechanical vibrator or equivalent device operated from a 60 cycle power supply. This will result in a sufficiently high vibrating frequency to insure a safe and reliable control of the demetallizing current or discharge. Where movable electrodes are used, as shown in Figs. 16, 18 and 24, the vibratory movement may be applied or superposed upon the resilient mounting elements in a manner readily understood.

According to a simple arrangement of the latter type, the demetallizing electrodes 70, 71 and 72 as shown in Figs. 19, 20, and 22 are attached to a common insulating support or plate, the latter being resiliently mounted by a rubber plate or equivalent supporting member. The insulating plate carries one or two soft iron elements acting as armatures for a magnet core. The latter carries a winding which is energized from a 60 cycle power supply circuit. As a result the electrodes will be subjected to a continued vibration with amplitudes determined by the rubber or other resilient mounting member.

In the foregoing, the invention has been described with specific reference to various illustrative devices and arrangements. It will be apparent, however, the numerous variations and modifications, as well as the substitution of equivalent elements and apparatus, for those shown and disclosed for illustration, may be made without departing from the broader scope and spirit of the invention as set forth in the appended claims. The specification and drawings are accordingly to be regarded in an illustrative rather than in a limiting sense.

Having thus described my invention, I claim:

1. In the art of manufacturing single-web wound metallized condensers, the method of patterning a metallized insulating strip preparatory to its winding into a condenser unit comprising the steps of moving said strip past a plurality of branding electrodes fixed relative to each other with the metal surface of said strip facing said electrodes, to burn opposite longitudinal track sections alternating with transverse track sections upon said strip forming a continuous zig-zag shaped insulating track and defining alternate electrode areas of opposite polarity, and controlling the timing of the branding current between said electrodes and said strip, to effect a progressive variation of the spacing distances between successive transverse track sections, to thereby cause the alternate electrode areas of opposite polarity to substantially register throughout the length of said strip, when said strip is subsequently wound into a rolled condenser unit.

2. Apparatus for patterning a metallized insulating strip preparatory to its winding into a single-web condenser unit comprising a plurality of branding electrodes fixed relative to each other, driving means for moving said strip past said electrodes with the metal surface of said strip facing said electrodes, to burn opposite longitudinal track sections alternating with transverse track sections upon said strip forming a continuous zig-zag shaped insulating track and defining alternate electrode areas of opposite polarity, and time control means in predetermined relation to said driving means, for controlling the branding currents between said electrodes and said strip, to effect a progressive variation of the spacing distances between successive transverse track sections, to thereby cause the alternate electrode areas of opposite polarity to substantially register throughout the length of said strip, when said strip is subsequently wound into a rolled condenser unit.

3. Apparatus for patterning a metallized insulating strip preparatory to its winding into a single-web condenser unit comprising a plurality of electric branding electrodes arranged at relatively fixed distances from each other, driving means for moving said strip past said electrodes with the metal surface of said strip facing said electrodes, control means for alternately and periodically advancing and retracting said electrodes, to burn opposite longitudinal track sections alternating with transverse sections upon said strip forming a continuous zig-zag shaped insulating track and defining alternate electrode areas of opposite polarity, and means for effecting a progressive variation of the relative speed between said driving means and said control means, to produce a gradual variation of the spacing distances between successive transverse track sections, to thereby cause the alternate electrode areas of opposite polarity to substantially register throughout the length of said strip, when said strip is subsequently wound into a rolled condenser unit.

4. Apparatus for patterning a metallized insulating strip preparatory to its winding into a single-web condenser unit comprising a plurality of electric branding electrodes arranged at relatively fixed distances from each other, driving means for moving said strip past said electrodes at a constant speed with the metal surface of said strip facing said electrodes, control means for alternately and periodically advancing and retracting said electrodes, to burn opposite longitudinal track sections alternating with transverse track sections upon said strip forming a continuous zig-zag shaped insulating track and defining alternate electrode areas of opposite polarity, and variable speed control means connecting said strip driving means with said control means, to effect a progressively varying relative speed between said strip and said control means, to thereby effect a gradual change of the spacing distances between successive transverse track sections so as to cause the alternate electrode areas of opposite polarity to substantially register throughout the length of said strip, when said strip is subsequently wound into a rolled condenser unit.

5. Apparatus for fabricating single-web wound metallized condensers comprising a mandrel for winding a metallized insulating strip into a rolled condenser unit, driving means for rotating said mandrel, a plurality of electric branding electrodes arranged in the path of said strip at relatively fixed distances from each other with the metal surface of said strip facing said electrodes, to burn opposite longitudinal track sections alternating with transverse track sections upon said strip forming a continuous zig-zag shaped insulating track and defining alternate electrode areas of opposite polarity, time control means in fixed coupling relation to said driving means, for controlling the branding currents between said electrodes and said strip, to effect a progressive increase of the spacing distances of successive transverse track sections, to thereby cause the alternate electrode areas of opposite polarity to substantially register throughout the length of said strip upon winding upon said mandrel.

6. Apparatus for patterning a metallized insulating strip preparatory to its winding into a single-web condenser unit comprising a plurality of electric branding electrodes arranged at relatively fixed distances from each other, driving means for moving said strip past said electrodes with the metal surface of said strip facing said electrodes, a source of branding current having one terminal connected to said metal surface, synchronized multiple switch means connected between said source and said electrodes, to burn opposite longitudinal track sections alternating with transverse track sections upon said strip forming a continuous zig-zag shaped insulating track and defining alternate electrode areas of opposite polarity, operating means for said switch means, and means for effecting a progressive variation of the relative speed between said driving means and said operating means, to effect a gradual variation of the spacing distances between successive transverse track sections and to thereby cause the electrode areas of opposite polarity to substantially register, when said strip is subsequently wound into a rolled condenser unit.

7. Apparatus for patterning a metallized insulating strip preparatory to its winding into a single-web condenser unit comprising a plurality of electric branding electrodes arranged at relatively fixed distances from each other, driving means for moving said strip past said electrodes with the metal surface of said strip facing said electrodes, a source of branding current having one terminal connected to said metal surface, a multiple commutator connecting said source to said electrodes, for burning longitudinal track sections alternating with transverse track sections upon said strip forming a continuous zig-zag shaped insulating track and defining alternate electrode areas of opposite polarity, means for rotating said commutator, and means for effecting a progressive relative speed variation between said driving means and said commutator, to effect a variation of the spacing distances between successive transverse track sections and to thereby cause the electrode areas of opposite polarity to substantially register, when said strip is subsequently wound into a rolled condenser unit.

8. Apparatus for patterning a metallized insulating strip preparatory to its winding into a single-web condenser unit comprising a plurality of electric branding electrodes arranged at relatively fixed distances from each other, driving means for moving said strip past said electrodes with the metal surface of said strip facing said electrodes, a source of branding current having one terminal connected to said metal surface, a patterned control tape moved in predetermined relation to said strip and including multiple pick-up means for periodically connecting said electrodes to said source, to produce branding currents for burning successive longitudinal track sections alternating with transverse track sections upon said strip forming a continuous zig-zag shaped insulating track and defining alternate electrode areas of opposite polarity adapted to substantially register, when said strip is subsequently wound into a rolled condenser unit.

9. Apparatus for patterning a metallized insulating strip preparatory to its winding into a single-web condenser unit comprising a plurality of electric branding electrodes arranged at relatively fixed distances from each other, driving means for moving said strip past said electrodes with the metal surface of said strip facing said electrodes, a source of branding current having one terminal connected to said metal surface, a perforated control tape having cooperating multiple contact elements to periodically connect said electrodes to said source, to produce branding current pulses for burning opposite longitudinal track sections alternating with transverse track sections upon said strip forming a continuous zig-zag shaped insulating track and defining alternate electrode areas of opposite polarity, operating means for said tape, and means for effecting a progressive variation of the relative speed between said driving means and said operating means, to effect a gradual variation of the spacing distances between successive transverse track sections and to thereby cause the alternate electrode areas of opposite polarity to substantially register when said strip is subsequently wound into a rolled condenser unit.

10. Apparatus for fabricating single-web wound metallized condensers comprising a rotating mandrel for winding a metallized insulating strip into a convolute spiral condenser unit, driving means for said mandrel, a plurality of electric branding electrodes arranged in the path of said strip at relatively fixed distances from each other with the metal surface of said strip facing said electrodes, a source of branding current having one terminal connected to said metal surface, multiple switch means connected between said source and said electrodes, for burning opposite longitudinal track sections alternating with transverse track sections upon said strip, operating means for said switch means, and positive coupling means between said driving means and said switch operating means, said track sections forming a continuous zig-zag shaped insulating track defining alternate electrode areas of opposite polarity adapted to substantially register throughout the length of said strip wound upon said mandrel.

11. Apparatus for fabricating single-web wound metallized condensers comprising a rotating mandrel for winding a metallized insulating strip into a convolute spiral condenser unit, driving means for said mandrel, a plurality of electric branding electrodes arranged in the path of said strip at relatively fixed distances from each other with the metal surface of said strip facing said electrodes, a source of branding current having one terminal connected to said metal surface, a multiple rotating commutator connecting said electrodes and source, and coupling means between said driving means and said commutator, to burn opposite longitudinal track sections alternating with transverse track sections upon said strip, said track sections forming a continuous zig-zag shaped insulating track separating alternate electrode areas of opposite polarity adapted to substantially register in the rolled unit wound upon said mandrel.

12. Apparatus for manufacturing single-web wound metallized condensers comprising a rotating mandrel for winding a metallized insulating strip into a convolute spiral condenser unit, driving means for said mandrel, a plurality of electric branding electrodes arranged in the path of said strip at relatively fixed distances from each other with the metal surface of said strip facing said electrodes, a source of branding current having one terminal connected to said metal surface, a perforated control tape and cooperating multiple contact elements connected to said electrodes and said source, operating means for said tape, and coupling means between said driving means and said operating means for burning opposite longitudinal track sections alternating with transverse track sections upon said strip, said track sections forming a continuous zig-zag shaped insulating track and defining alternate electrode areas of opposite polarity adapted to substantially register in the rolled unit wound upon said mandrel.

13. Apparatus for patterning a metallized insulating strip preparatory to its winding into a single-web condenser unit comprising a plurality of branding electrodes arranged at relatively fixed distances from each other, driving means for moving said strip past said electrodes with the metal surface of said strip facing said electrodes, a control tape having multiple tracks of progressively varying patterns, a source of branding current having one terminal connected to said metal surface, multiple current pick-up means cooperating with said tape and connected to said electrodes and said source, for producing branding current pulses between said electrodes and said strip, to burn alternate longitudinal and transverse track sections upon said strip forming a continuous zig-zag shaped insulating track and defining alternate electrode areas of opposite polarity, and operating means for said tape in predetermined coupling relation to said driving means, to effect a progressive variation of the spacing distances between successive transverse track sections, to cause the alternate electrode areas of opposite polarity to substantially register, when said strip is subsequently wound into a rolled condenser unit.

14. Apparatus for patterning a metallized insulating strip preparatory to its winding into a single-web condenser unit comprising a plurality of branding electrodes arranged at relatively fixed distances from each other, driving means for moving said strip past said electrodes with the metal surface of the strip facing said electrodes, a moving control tape having multiple perforations of progressively varying patterns, a source of branding current having one terminal connected to said metal surface, multiple electrode means cooperating with said tape and connected to said branding electrodes and said source, for timing the branding currents, to burn alternate longitudinal and transverse track sections upon said strip forming a continuous zig-zag shaped insulating track defining alternate electrode areas of opposite polarity, and operating means for said tape in predetermined coupling relation to said driving means.

15. In the art of fabricating wound metallized condensers wherein a metallized insulating strip is provided with a continuous zig-zag shaped insulating track having longitudinal and transverse track sections defining alternate electrode areas of opposite polarity, the method of patterning said metallized insulating strip comprising the steps of advancing said strip past a branding element to burn said longitudinal and transverse track sections thereon by repeated operation and progressively altering the relationship between the rate of advance of the strip and the rate of operation of the branding element to effect a corresponding gradual variation of the spacing distances between successive transverse track sections, to thereby cause the alternate electrode areas of opposite polarity to substantially register throughout the length of the strip when said strip is subsequently wound into a rolled condenser unit.

16. In the art of fabricating wound metallized condensers wherein a metallized insulating strip is provided with a continuous zig-zag shaped insulating track having longitudinal and transverse track sections defining alternate electrode areas of opposite polarity, the method of patterning said metallized insulating strip comprising the steps of advancing said strip past a branding element to burn said longitudinal and transverse track sections thereon by repeated operation and progressively varying the rate of advance of said strip past said branding element to effect a corresponding gradual variation of the spacing distances between successive transverse track sections, to thereby cause the alternate electrode areas of opposite polarity to substantially register throughout the length of the strip when said strip is subsequently wound into a rolled condenser unit.

17. In the art of fabricating wound metallized condensers wherein a metallized insulating strip is provided with a continuous zig-zag shaped insulating track having longitudinal and transverse track sections defining alternate electrode areas of opposite polarity, the method of patterning said metallized insulating strip comprising the steps of advancing said strip past a branding element to burn longitudinal and transverse track sections thereon by repeated operation and progressively varying the rate of operation of said branding element to effect a corresponding gradual variation of the spacing distances between successive transverse track sections, to thereby cause the alternate electrode areas of opposite polarity to substantially register throughout the length of the strip when said strip is subsequently wound into a rolled condenser unit.

18. In the art of fabricating wound metallized condensers wherein a metallized insulating strip is provided with a continuous zig-zag shaped insulating track having longitudinal and transverse track sections defining alternate electrode areas of opposite polarity, the method of patterning said metallized insulating strip comprising the steps of advancing said strip past at least one rotating branding roller having raised branding ribs thereon with the metal surface of the strip facing said roller to burn said longitudinal and transverse track sections thereon by repeated operation and progressively altering the relationship between the rate of advance of the strip and the rate of operation of the branding roller to effect a corresponding gradual variation of the spacing distances between successive transverse track sections, to thereby cause the alternate electrode areas of opposite polarity to substantially register throughout the length of the strip when said strip is subsequently wound into a rolled condenser unit.

19. The process as set forth in claim 18 wherein the progressive alteration in the relative speed is effected by maintaining the rate of rotation of the branding roller constant and progressively varying the rate of strip advance therepast.

20. The process as set forth in claim 18 wherein the progressive alteration in the relative speed between the advance of the strip and the rate of operation of the branding roller is effected by maintaining the rate of strip advance constant and progressively varying the rate of rotation of said branding roller.

21. In the art of fabricating wound metallized condensers, the method of patterning a metallized insulating strip preparator to its winding into a convolute spiral condenser unit comprising the steps of moving said strip past at least one electric branding electrode with the metal surface of the strip facing said electrode, to burn a zig-zag shaped insulating track upon said strip having longitudinal and transverse track sections and defining alternate electrode areas of opposite polarity, and controlling the timing of the branding current between said strip and electrode, to effect a progressive variation of the spacing distance between successive transverse track sections, to thereby cause the alternate electrode areas of opposite polarity to substantially register throughout the entire length of said strip, when said strip is subsequently wound into a rolled condenser unit.

22. In the art of fabricating wound metallized condensers, the method of patterning a metallized insulating strip preparatory to its winding into a convolute spiral condenser unit comprising moving said strip past at least one rotating branding roller having raised Z-shaped branding ribs with the metal surface of the strip facing said roller, to burn a continuous zig-zag shaped insulating track upon said strip having longitudinal and transverse track sections and defining alternate electrode areas of opposite polarity, and progressively varying the relative speed between said roller and said strip, to effect a corresponding gradual variation of the spacing distances between successive transverse track sections, to thereby cause the alternate electrode areas of opposite polarity to substantially register throughout the length of said strip, when said strip is subsequently wound into a rolled condenser unit.

23. Apparatus for patterning metallized insulating strip preparatory to its winding into a convolute spiral condenser unit comprising a branding element for burning a continuous zig-zag shaped insulating track upon said strip by repeated operation, said continuous zig-zag shaped track formed of longitudinal and transverse track sections defining alternate electrode areas of opposite polarity, means for advancing said strip past said branding element, and means for progressively altering the relationship between the rate of advance of the strip and rate of operation of the branding element to effect a corresponding variation of the spacing distances between successive transverse track sections, whereby the electrode areas of opposite polarity are in substantial register throughout the length of the strip when the strip is subsequently wound into a convolute condenser unit.

24. The apparatus as set forth in claim 23 wherein the rate of operation of the branding element is maintained constant and the rate of strip advance is progressively varied.

25. The apparatus as set forth in claim 23 wherein the rate of strip advance is maintained constant and the rate of operation of said branding element is progressively varied.

26. The apparatus as set forth in claim 23 wherein said branding element comprises a branding roller having a peripheral configuration corresponding to the desired longitudinal and transverse track sections.

27. Apparatus for fabricating wound metallized condensers comprising a mandrel for winding a metallized insulating strip into a convolute spiral condenser unit, driving means for rotating said mandrel, a branding element positioned in the path of advance of said strip for burning a continuous zig-zag shaped insulating track upon said strip by repeated operation, said zig-zag shaped track formed of longitudinal and transverse track sections defining alternate electrode areas of opposite polarity and of progressively altered pitch, and means responsive to rotation of said mandrel for operating said branding element in predetermined relationship to the rate of strip advance to effect the demetallizing of said longitudinal and transverse track sections to form said alternate electrode areas of progressively altered pitch.

28. Apparatus as set forth in claim 27 wherein said branding element comprises a branding roller.

29. Apparatus for fabricating patterned metallized insulating strips having a continuous zig-zag shaped insulating track thereon formed of longitudinal and transverse track sections defining alternate electrode areas of opposite polarity and of predetermined progressively varying size, comprising a branding element for burning said longitudinal and transverse track sections of said strip by repeated operation, means for advancing said strip past said branding element, and means for progressively altering the operational relationship between said rate of strip advance and said branding element to progressively alter the spacing of said transverse track sections and provide the desired progressive variation in the size of successive electrode areas.

30. Apparatus for fabricating metallized insulating strips having a continuous zig-zag shaped insulating track formed of longitudinal and transverse track sections defining alternate electrode areas of opposite polarity and of progressively varying size, comprising a branding electrode displaceably positioned in sparking contact with said strip, means for reciprocating said electrode transversely of said strip by repeated operation for burning said longitudinal and transverse track sections thereon, means for advancing said strip past said branding electrode, and means for progressively altering the operational relationship between the rate of strip advance and the rate of reciprocation of said electrode to progressively alter the spacing of said transverse track sections and provide the desired progressive variation in size of successive electrode areas.

31. Apparatus for fabricating patterned metallized insulating strips having a continuous zig-zag shaped insulating track formed of longitudinal and transverse track sections defining alternate electrode areas of opposite polarity and of predetermined progressively varying size comprising a plurality of individual branding electrodes positioned transversely of said strip, reciprocating means for selectively energizing said individual electrodes by repeated operation for burning said longitudinal and transverse track sections on said strip, means for advancing said strip past said branding electrodes, and means for progressively altering the operational relationship between the rate of strip advance and the rate of reciprocation of said reciprocating means to progressively alter the spacing of said transverse track sections and provide the desired progressive variation in size of successive electrode areas.

References Cited in the file of this patent

UNITED STATES PATENTS

| | | |
|---|---|---|
| 2,549,966 | Grouse | Apr. 24, 1951 |
| 2,637,766 | Grouse | May 5, 1953 |